(12) United States Patent
Takahashi

(10) Patent No.: US 7,433,062 B2
(45) Date of Patent: Oct. 7, 2008

(54) COLOR IMAGE PROCESSING METHOD AND APPARATUS, AND STORAGE MEDIUM

(75) Inventor: Hiroyuki Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 09/922,647

(22) Filed: Aug. 7, 2001

(65) Prior Publication Data

US 2002/0054314 A1 May 9, 2002

(30) Foreign Application Priority Data

| Aug. 8, 2000 | (JP) | ............................. 2000-239752 |
| Aug. 8, 2000 | (JP) | ............................. 2000-239753 |
| Jul. 26, 2001 | (JP) | ............................. 2001-226078 |

(51) Int. Cl.
*G06F 3/12* (2006.01)

(52) U.S. Cl. ........................ 358/1.13; 358/1.9; 358/448; 358/518; 358/519

(58) Field of Classification Search ................. 382/167; 347/251; 358/1.13, 1.9, 448, 518, 519
See application file for complete search history.

(56) References Cited

U.S. PATENT DOCUMENTS

| 5,271,096 A | 12/1993 | Cook ......................... 395/131 |
| 5,608,549 A | 3/1997 | Usami ......................... 358/530 |
| 5,642,208 A * | 6/1997 | Takahashi et al. ........... 358/501 |
| 5,852,674 A | 12/1998 | Takahashi et al. ........... 382/167 |
| 6,035,103 A * | 3/2000 | Zuber ......................... 358/1.9 |
| 6,184,915 B1 | 2/2001 | Atsumi et al. ............... 347/251 |
| 6,738,151 B1 * | 5/2004 | Kato ......................... 358/1.12 |
| 2001/0038468 A1 | 11/2001 | Hiramatsu .................. 358/518 |

FOREIGN PATENT DOCUMENTS

EP 0 588 513 A2 3/1994

\* cited by examiner

*Primary Examiner*—King Y. Poon
*Assistant Examiner*—Michael Burleson
(74) *Attorney, Agent, or Firm*—Fitzpatrick, Cella, Harper & Scinto

(57) ABSTRACT

An image processing method for processing an input job in parallel using a plurality of color image output apparatus, includes developing input image data into bit map image data, using either of first and second modes. In the first mode, the input image data is developed a plurality of times, using a color processing condition matching each of the plurality of color image output apparatus, while in the second mode, the input image data is developed using an optional color processing condition and the developed result is outputted to the plurality of color image output apparatus. A user is allowed to select either a high-speed process or a high-precision process.

4 Claims, 26 Drawing Sheets

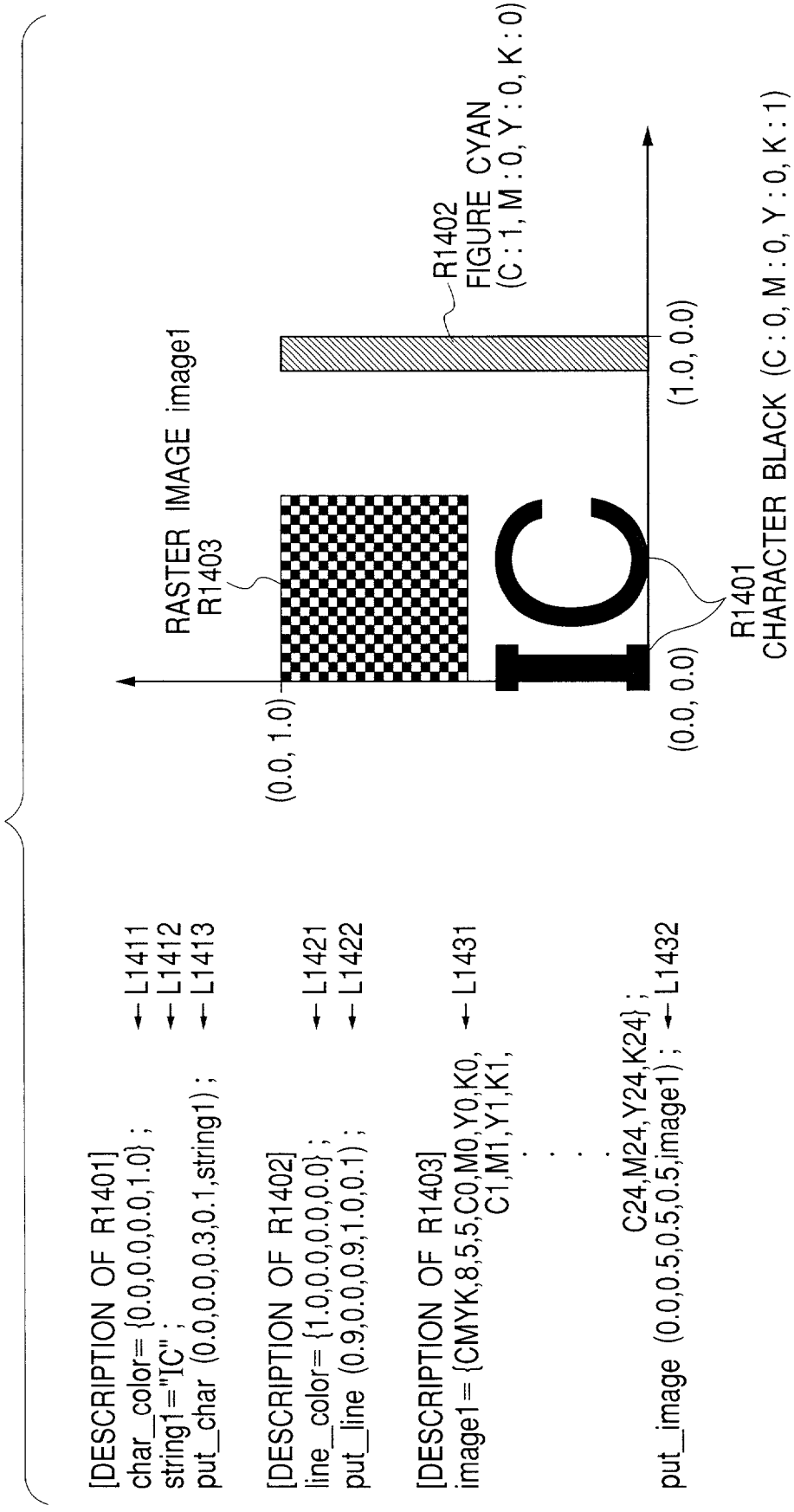

FIG. 15

$$\begin{cases} \begin{pmatrix} L^* \\ a^* \\ b^* \end{pmatrix} = \begin{bmatrix} a00 & a01 & a02 \\ a10 & a11 & a12 \\ a20 & a21 & a22 \end{bmatrix} \begin{pmatrix} R \\ G \\ B \end{pmatrix} \cdots\cdots (E1501) \\ \\ \begin{pmatrix} L^* \\ a^* \\ b^* \end{pmatrix} = \begin{bmatrix} b00 & b01 & b02 & b03 \\ b10 & b11 & b12 & b13 \\ b20 & b21 & b22 & b23 \end{bmatrix} \begin{pmatrix} C \\ M \\ Y \\ K \end{pmatrix} \cdots\cdots (E1502) \\ \\ \begin{pmatrix} C \\ M \\ Y \\ K \end{pmatrix} = \begin{bmatrix} c00 & c01 & c02 \\ c10 & c11 & c12 \\ c20 & c21 & c22 \\ c30 & c31 & c32 \end{bmatrix} \begin{pmatrix} L^* \\ a^* \\ b^* \end{pmatrix} \cdots\cdots (E1503) \end{cases}$$

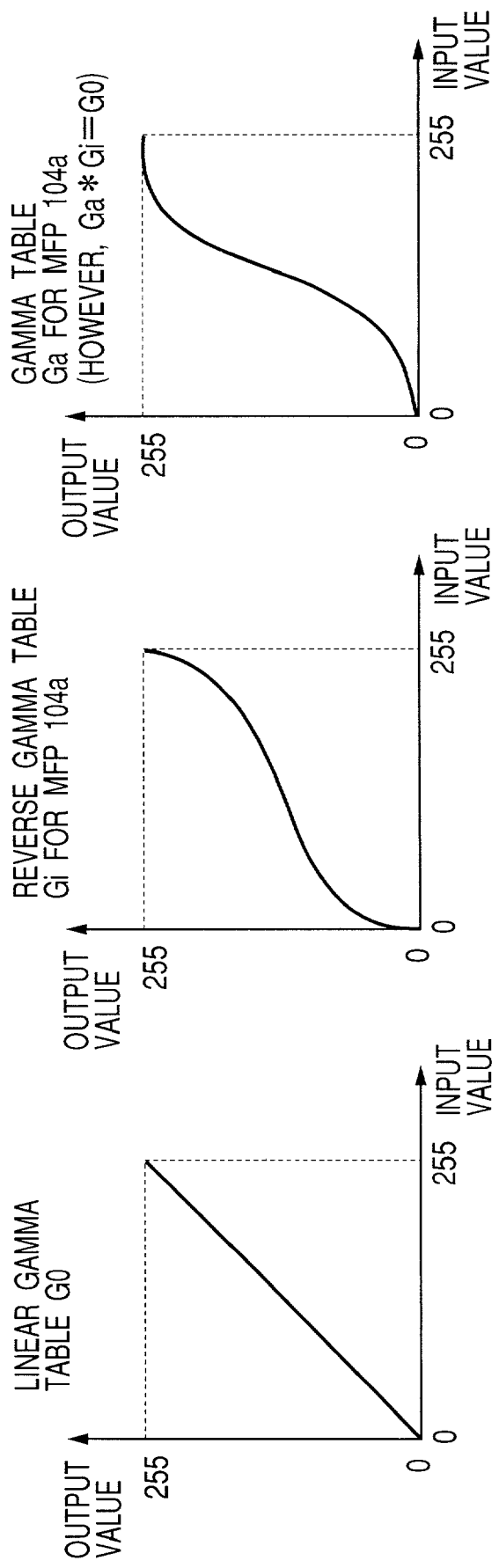

- SEQUENCE FORMULA USING PROFILE Pa FOR MFP 104a $$\begin{bmatrix} C \\ M \\ Y \\ K \end{bmatrix} = \begin{bmatrix} c00 & c01 & c02 \\ c10 & c11 & c12 \\ c20 & c21 & c22 \\ c30 & c31 & c32 \end{bmatrix} \begin{bmatrix} L^* \\ a^* \\ b^* \end{bmatrix} \quad \cdots (E1503)$$

- SEQUENCE FORMULA USING PROFILE Pb FOR MFP 104b $$\begin{bmatrix} C \\ M \\ Y \\ K \end{bmatrix} = \begin{bmatrix} d00 & d01 & d02 \\ d10 & d11 & d12 \\ d20 & d21 & d22 \\ d30 & d31 & d32 \end{bmatrix} \begin{bmatrix} L^* \\ a^* \\ b^* \end{bmatrix} \quad \cdots (E2001)$$

- SEQUENCE FORMULA USING PROFILE Pc WHICH EQUALIZED MFP 104a AND MFP 104b $$\begin{bmatrix} C \\ M \\ Y \\ K \end{bmatrix} = \begin{bmatrix} (c00+d00)/2 & (c01+d01)/2 & (c02+d02)/2 \\ (c10+d10)/2 & (c11+d11)/2 & (c12+d12)/2 \\ (c20+d20)/2 & (c21+d21)/2 & (c22+d22)/2 \\ (c30+d30)/2 & (c31+d31)/2 & (c32+d32)/2 \end{bmatrix} \begin{bmatrix} L^* \\ a^* \\ b^* \end{bmatrix} \quad \cdots (E2002)$$

FIG. 22

- SEQUENCE FORMULA USING PROFILE Pa FOR MFP 104a
(HOWEVER, 30 SETS ARE PRINTED BY MFP 104a OF 30ppm)

$$\begin{bmatrix} C \\ M \\ Y \\ K \end{bmatrix} = \begin{bmatrix} c00 & c01 & c02 \\ c10 & c11 & c12 \\ c20 & c21 & c22 \\ c30 & c31 & c32 \end{bmatrix} \begin{bmatrix} L^* \\ a^* \\ b^* \end{bmatrix} \quad \cdots (E1503)$$

- SEQUENCE FORMULA USING PROFILE Pb FOR MFP 104b
(HOWEVER, 20 SETS ARE PRINTED BY MFP 104b OF 20ppm)

$$\begin{bmatrix} C \\ M \\ Y \\ K \end{bmatrix} = \begin{bmatrix} d00 & d01 & d02 \\ d10 & d11 & d12 \\ d20 & d21 & d22 \\ d30 & d31 & d32 \end{bmatrix} \begin{bmatrix} L^* \\ a^* \\ b^* \end{bmatrix} \quad \cdots (E2001)$$

- SEQUENCE FORMULA USING PROFILE Pd WHICH EXECUTES WEIGHTING AND ADDITION TO MFP 104a AND MFP 104b $$\begin{bmatrix} C \\ M \\ Y \\ K \end{bmatrix} = \begin{bmatrix} (3*c00+2*d00)/5 & (3*c01+2*d01)/5 & (3*c02+2*d02)/5 \\ (3*c10+2*d10)/5 & (3*c11+2*d11)/5 & (3*c12+2*d12)/5 \\ (3*c20+2*d20)/5 & (3*c21+2*d21)/5 & (3*c22+2*d22)/5 \\ (3*c30+2*d30)/5 & (3*c31+2*d31)/5 & (3*c32+2*d32)/5 \end{bmatrix} \begin{bmatrix} L^* \\ a^* \\ b^* \end{bmatrix} \quad \cdots (E2201)$$

- EXAMPLE AT THE TIME OF USING SEQUENCE FORMULA OF PROFILE CORRECTION UNIT $$\begin{bmatrix} C \\ M \\ Y \\ K \end{bmatrix} = \begin{bmatrix} e00 & e01 & e02 & e03 \\ e10 & e11 & e12 & e13 \\ e20 & e21 & e22 & e23 \\ e30 & e31 & e32 & e33 \end{bmatrix} \begin{bmatrix} C0 \\ M0 \\ Y0 \\ K0 \end{bmatrix} \quad \cdots\cdots \text{ (E2003)}$$

COLOR IMAGE PROCESSING METHOD AND APPARATUS, AND STORAGE MEDIUM

BACKGROUND OF THE INVENTION

1. Field of the Invention

The present invention relates to an image processing method and apparatus for processing an input job in parallel at a plurality of color image output apparatus, and to a storage medium storing a program realizing such a method.

2. Related Background Art

A user selects a desired printer by using a printer driver and an application running on a computer, and instructs a print job via a public line such as a LAN and a dedicated interface. A server/client system is well known in which a client user sends a job via a document server to a printer.

In the market called print-on-demand or the like, a document made up of a large number of pages such as a manual or an operation instruction document, or documents of a large number of volumes from publishing companies, are often requested to be printed. In order to deal with such cases, the concept of cluster printing has been proposed, in which one document in a server or client is printed by a plurality of printers at the same time. In addition, color documents are also quite prevalent, and cluster printing for color documents would be desirable.

Cluster printing for color documents poses a problem of a difference between hues of output samples printed by printers, this problem not being associated with cluster printing for white and black documents. An environmental change or secular change of each printer can be mitigated to some degree by calibrating the printer. However, since printers have characteristics specific to them, minute differences therebetween appear in output samples. Such differences in hues between output samples printed out at the same time becomes a critical issue to a user. Although a difference between hues of printers of the same type is less conspicuous, a difference between hues of printers of different type is a more serious problem.

Color adjustment for a printer is generally included in a series of processes called RIP processes of converting PDL data into bit map data. Only the color matching process cannot be used independently. In order to print out data from a plurality of color MFP's, it is necessary to perform the RIP process a plurality of times, which requires double the normal RIP time.

SUMMARY OF THE INVENTION

The present invention has been made in consideration of the above-described disadvantages and aims to process input image data in parallel at a plurality of color image output apparatus at high speed, while reducing the number of RIP processes of developing the input image data into bit map image data.

It is also an object of the invention to allow a user to select either a high speed process or a high precision process.

In order to achieve these objects of the invention, there is provided an image processing method for processing an input job in parallel by a plurality of color image output apparatus, comprising: a developing step of developing input image data into bit map image data, wherein the developing step includes first and second modes, wherein the first mode develops the input image data a plurality of times by using a color processing condition corresponding to each of the plurality of color image output apparatus, wherein and the second mode develops the input image data by using an optional color processing condition and outputs a result obtained in said developing step to the plurality of color image output apparatus.

According to another aspect of the invention, there is provided an image processing method for processing an input job in parallel by a plurality of color image output apparatus, comprising: a developing step of developing input image data into bit map image data for a first color image output apparatus; and a converting step of converting the bit map image data for the first color image output apparatus into bit map image data for a second color image output apparatus, wherein the bit map image data for the first color image output apparatus developed by the developing step is transferred to the first color image output apparatus, and wherein the bit map image data for the second color image output apparatus converted by the converting step is transferred to the second color image output apparatus.

Other objects and features of the present invention will become apparent from the following detailed description of embodiments when read in conjunction with the accompanying drawings.

BRIEF DESCRIPTION OF THE DRAWINGS

FIG. 14 shows a description example of PDL data and raster-developed data.

FIG. 15 shows sequence formulas using a source profile and a printer profile.

FIGS. 16-1, 16-2, and 16-3 are diagrams showing gamma curves.

FIG. 22 shows sequence formulas using printer profiles.

FIG. 24 shows sequence formulas using printer profiles.

FIG. 28 shows a sequence formula for a profile correction unit.

DETAILED DESCRIPTION OF THE PREFERRED EMBODIMENTS

First Embodiment

Description of Outline of System

Figure 1:
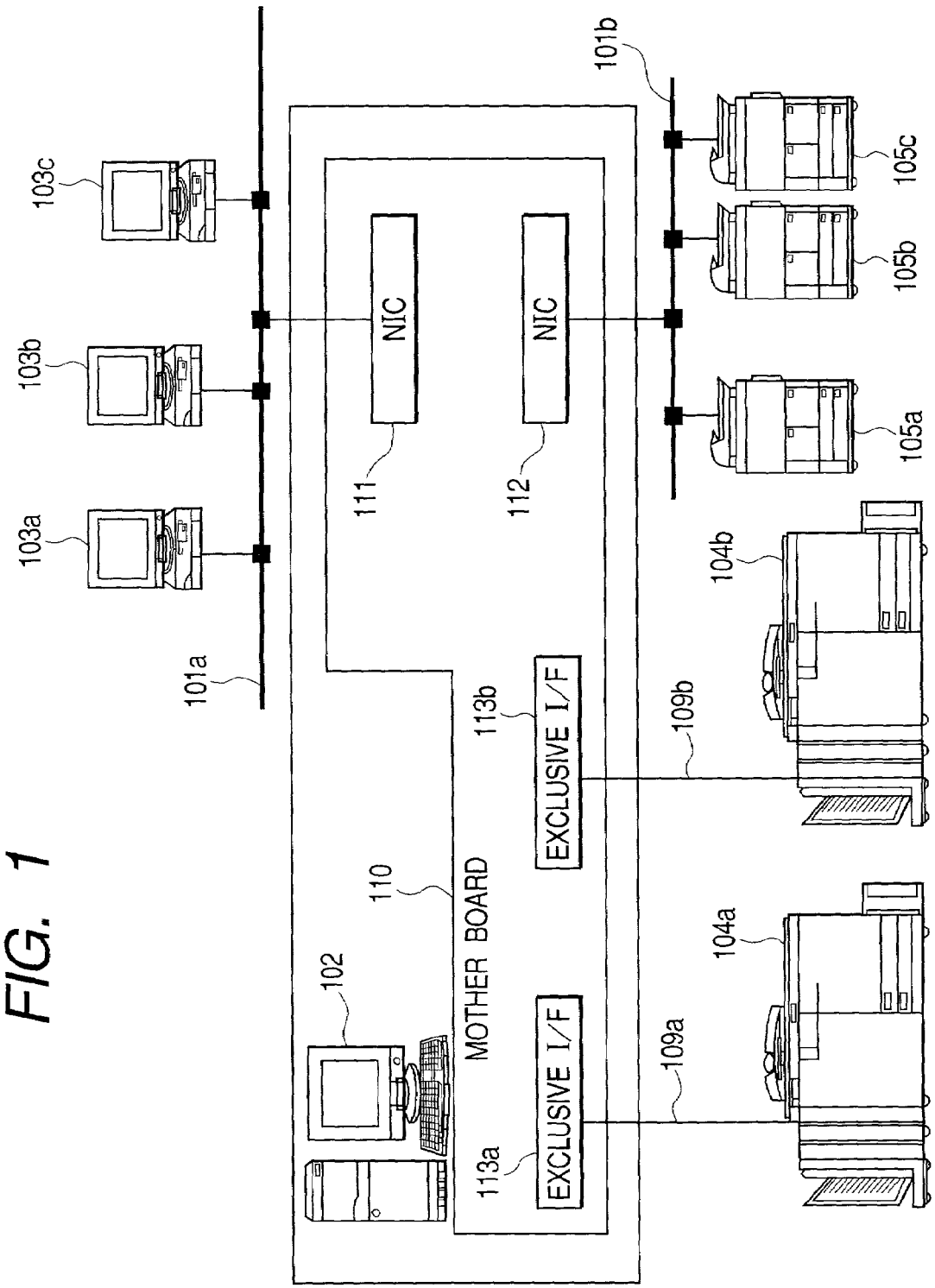
FIG. 1 is a diagram showing the entirety of a system according to an embodiment of the invention.
Figure 2:
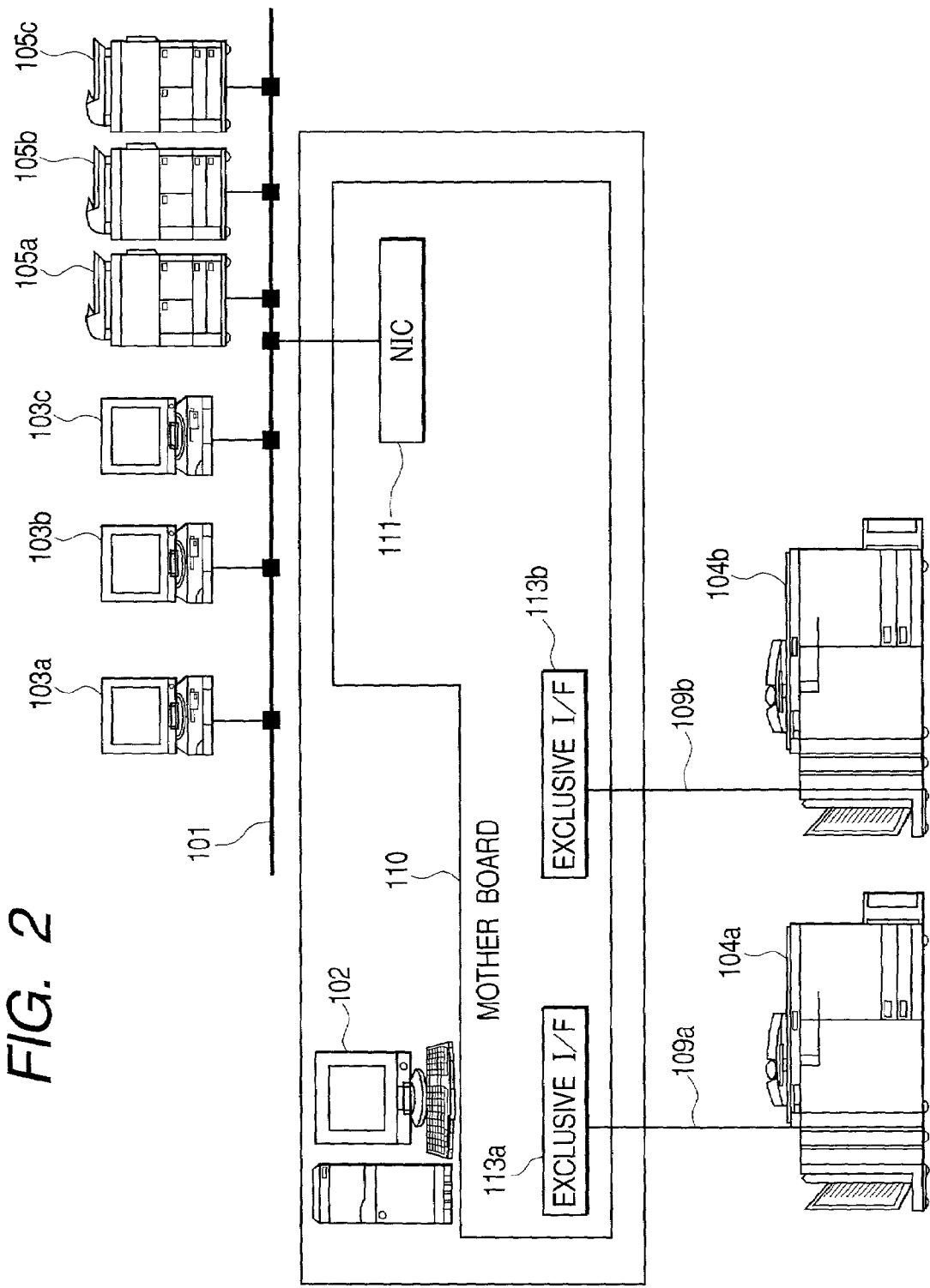
FIG. 2 is a diagram showing the entirety of a system according to another embodiment of the invention.

FIGS. 1 and 2 are schematic diagrams showing examples of the structure of a system according to an embodiment.

In the system shown in FIG. 1, a network 101 is divided into two series in order to improve the performance of the system. Two series of the network shown in FIG. 1 are called a public network 101a and a private network 101b. The system configuration is not limited only to those shown in FIGS. 1 and 2, but other configurations may also be used.

A document server 102 has two network interface cards (NIC) for two hardware series. One NIC 111 is connected to the public network 101a, and the other NIC 112 is connected to the private network 101b connected to printers.

Computers 103a, 103b and 103c are clients which send a job to the document server. Although not shown, a number of other clients are connected to the public network. Clients are represented collectively hereinafter by reference numeral 103.

Multi-function peripherals (MFP's) 105 are connected to the private network 101b. MFP 105 can scan and print a monochromatic image or a color image at a low resolution or in a binary state. Although not shown, other MFP's as well as scanners, printers and FAXes are also connected to the private network 101b.

An MFP 104 is a full color MFP capable of scanning and printing a full color image at a high resolution and at a high gradation level. Although MFP 104 may be connected to the private network 101b, it is connected to the document server 102 via a specific interface card 113 in order to allow a plurality of bits to be transferred at the same time, because it handles a great amount of data to be transferred.

In this embodiment, at least two full color MFP's 104a and 104b are controlled. Two specific I/F cards 113 (113a and 113b) are provided to control the full color MFP's 104a and 104b independently.

In the hardware structure of the document server 102, a mother board 110 with a CPU, a memory and the like has NIC's 111 and 112 and exclusive I/F cards 113 connected via a PCI bus.

The client computer 103 creates and edits various documents and figures by using an application program which executes desk top publishing (DTP). The created document/figure data is converted into page description language (PDL) by the client computer 103, and transferred via the network 101a to MFP 104 or 105 to be printed out.

MFP's 104, 105 have communication means capable of exchanging information with the document server 102 via the network 101b or an exclusive interface 109 (109a, 109b). Information and the status of MFP's 104, 105 are supplied when necessary to the document server 102 or to the client computer 103 via the document server 102. The document server 102 (or client 103) has utility software for processing the information received from MFP's 104, 105 which is controlled by the computer 102 (or client 103).

Structure of MFP's 104, 105

With reference to FIGS. 3 to 11, the structure of MFP's 104, 105 will be described. A difference between MFP 104 and MFP 105 is whether a full color image or a monochromatic image is processed. The full color apparatus often includes the functions of the monochromatic apparatus, apart from the color processing function. For this reason, the description is mainly directed to the full color apparatus, and additional description for the monochromatic apparatus will be given when necessary.

MFP's 104, 105 have a scanner unit 201 for reading an image, a scanner IP unit 202 for processing image data, a NIC unit 204 for transferring image data and apparatus information via the network, and an exclusive I/F unit 205 for exchanging information with the full color MFP 104. A core unit 206 temporarily stores image data and determines a route depending upon the status of MFP's 104, 105.

Image data output from the core unit 206 is supplied to a printer unit 209 via a printer IP unit 207 and a PWM unit 208. Paper sheets printed out at the printer unit 209 are sent to a finisher unit 210 which performs a finishing process such as sorting and finishing.

Structure of Scanner Unit 201

Figure 4:
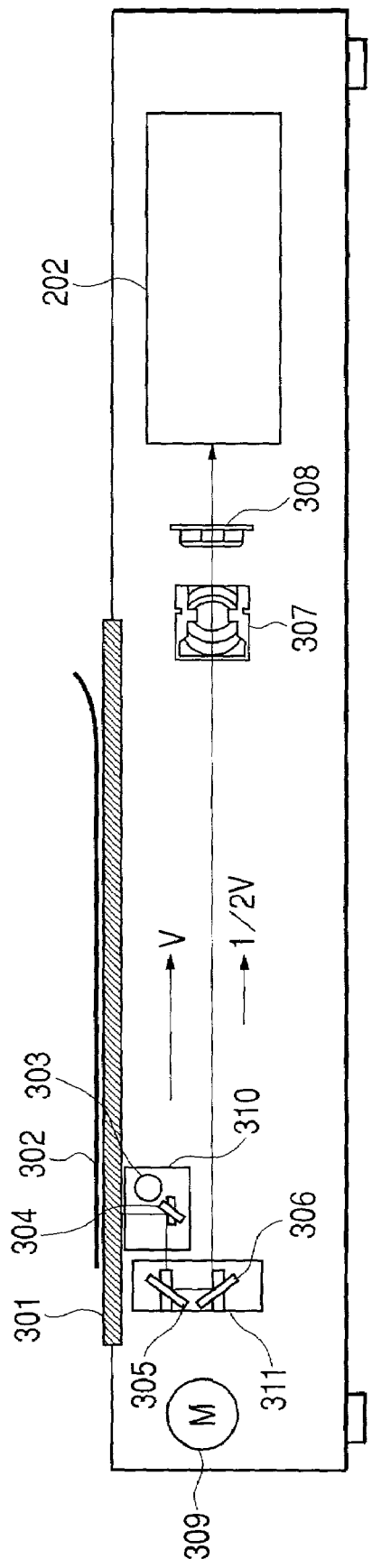
FIG. 4 is a diagram showing a scanner unit of the image forming apparatus.

With reference to FIG. 4, the structure of the scanner unit 201 will be described. An original (manuscript) 302 to be read is placed on an original support glass 301. The original 302 is illuminated with an illumination lamp 303, and reflected light is focused upon a CCD 308 via mirrors 304, 305 and 306 and a lens 307. A first mirror unit 310 including the mirror 304 and illumination lamp 303 moves at a speed v, and a second mirror unit 311 including the mirrors 305 and 306 moves at a speed ½v, thereby to scan the whole area of the original 302. The first and second mirror units 310 and 311 are driven by a motor 309.

Structure of Scanner IP Unit 202

Figure 5:
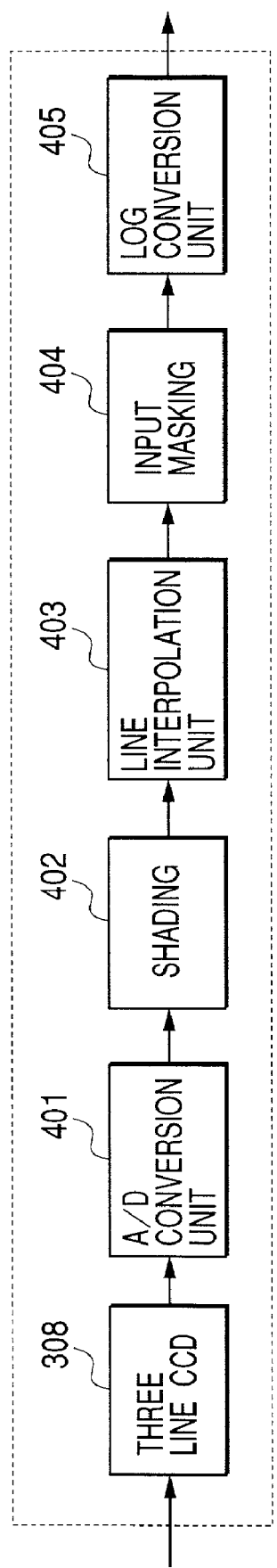
FIG. 5 is a diagram showing a scanner IP unit of the image forming apparatus.

With reference to FIG. 5, the scanner IP unit 202 will be described. An input optical signal is converted into an electrical signal by a CCD sensor 308. The CCD sensor 308 is a color sensor having RGB three lines, and R (red), G (green) and B (blue) image signals are input to an A/D conversion unit 401 which performs a gain adjustment and an offset adjustment and thereafter converts the image signals into 8-bit digital color image signals R0, G0 and B0. A shading unit 402 performs a well-known shading correction for each color by using a signal read from a reference white plate. Since respective color line sensors of the CCD sensor 308 are disposed spaced apart by a predetermined distance, a line delay adjustment circuit (line interpolation unit) 403 corrects the spatial displacement in the sub-scan direction.

Next, an input masking unit 404 converts a read color space determined by the spectral characteristics of R, G and B filters of the CCD sensor 308 into the NTSC standard color space. Specifically, it converts input (R0, G0, B0) signals into standard (R, G, B) signals by a 3×3 matrix calculation using constants which are specific to the apparatus and are obtained by taking into consideration the sensitivity characteristics of the CCD sensor 308, the spectral characteristics of the illumination lamp and the like.

A luminance/density conversion unit (LOG conversion unit) 405 is made of a look-up table (LUT) RAM, and converts RGB luminance signals into density signals of C1 (cyan), M1 (magenta) and Y1 (yellow).

Structure of NIC Unit 204 and Exclusive I/F Unit 205

The NIC unit 204 provides a function of interfacing with the network 101. Data is transferred to and from the external by using an Ethernet cable such as 10 Base-T and 100 Base-TX.

The exclusive I/F unit 205 provides a function of interfacing with the full color MFP 104 and transferring CMYK signals of multi bits. The exclusive I/F unit 205 transfers image data of four colors of 8 bits and includes communication lines. If data is transmitted via an Ethernet cable, the transfer speed is insufficient for MFP 104 and the performance of other devices connected to the network is sacrificed. From these reasons, the exclusive parallel interface is used.

Structure of Core Unit 206

The bus selector unit 221 of the core nit 206 provides a function of routing control of MFP's 104, 105. Namely, the bus selector unit 221 selects a bus in accordance with various functions of MFP's 104, 105 such as copy function, network scan function, network print function, and a display function.

Bus selection patterns for executing each function are shown below:
  copy function: scanner 201→core 206→printer 209
  network scan function: scanner 201→core 206→NIC unit 204
  network print function: NIC unit 204→core 206→printer 209

Image data output from the bus selector 221 is supplied to the printer unit 209 via the compression unit 222, memory unit 223 of large capacity such as a hard disk drive (HDD) and expansion unit 224. The compression method to be used by the compression unit 222 may be general methods such as JPEG, JBIG and ZIP. The compressed image data is managed for each job and stored together with additional data such as a file name, a creator name, a creation date and time, and a file size.

If a job number and a password are stored together, it is possible to support a personal box function. This function is used for preventing data in HDD from being temporarily stored or printed out by persons other than authorized persons. If a print-out of a stored job is designated, after authentication of the password is performed, the job is read from the memory unit 223 and image expansion is performed to recover raster images which are sent to the printer unit 207.

Structure of Printer IP unit 207

Figure 6:
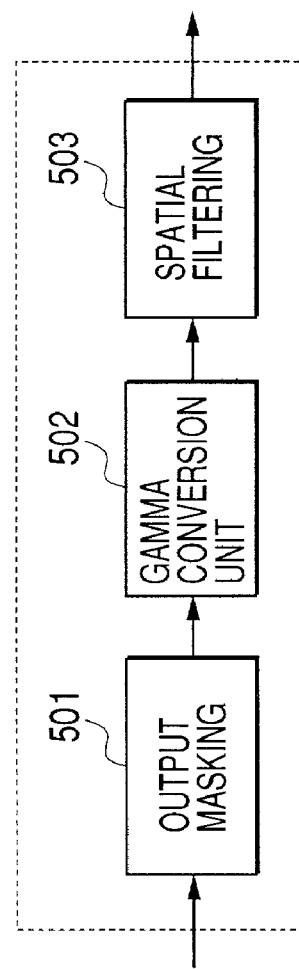
FIG. 6 is a diagram showing a printer IP unit of the image forming apparatus.

With reference to FIG. 6, the printer IP unit will be described. An output masking/UCR circuit unit 501 converts M1, C1 and Y1 signals into Y (yellow), M (magenta) C (cyan) and K (black) signals matching toner colors of the image forming apparatus, by a matrix calculation. This conversion is performed in accordance with the toner spectral distribution characteristics.

A gamma correction unit 502 performs correction by using a look-up table (LUT) RAM while considering the characteristics of hue and the like such as the toner gradation characteristics. A spatial filter 503 performs sharpness correction and smoothing correction and outputs image signals to the PWM unit 208.

Structure of PWM Unit 208

Figure 7:
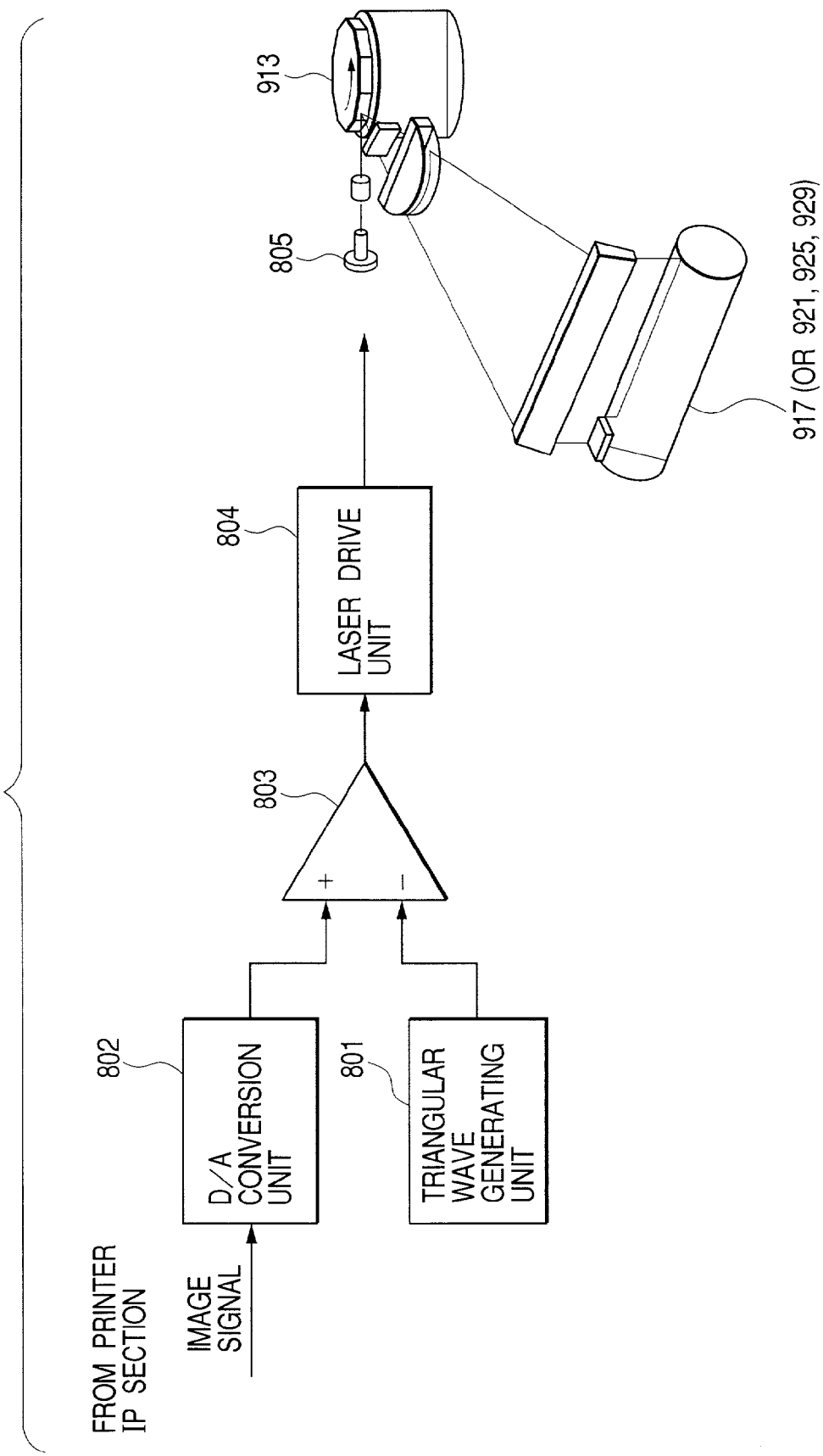
FIG. 7 is a block diagram showing a PWM unit of the image forming apparatus.
Figure 8:
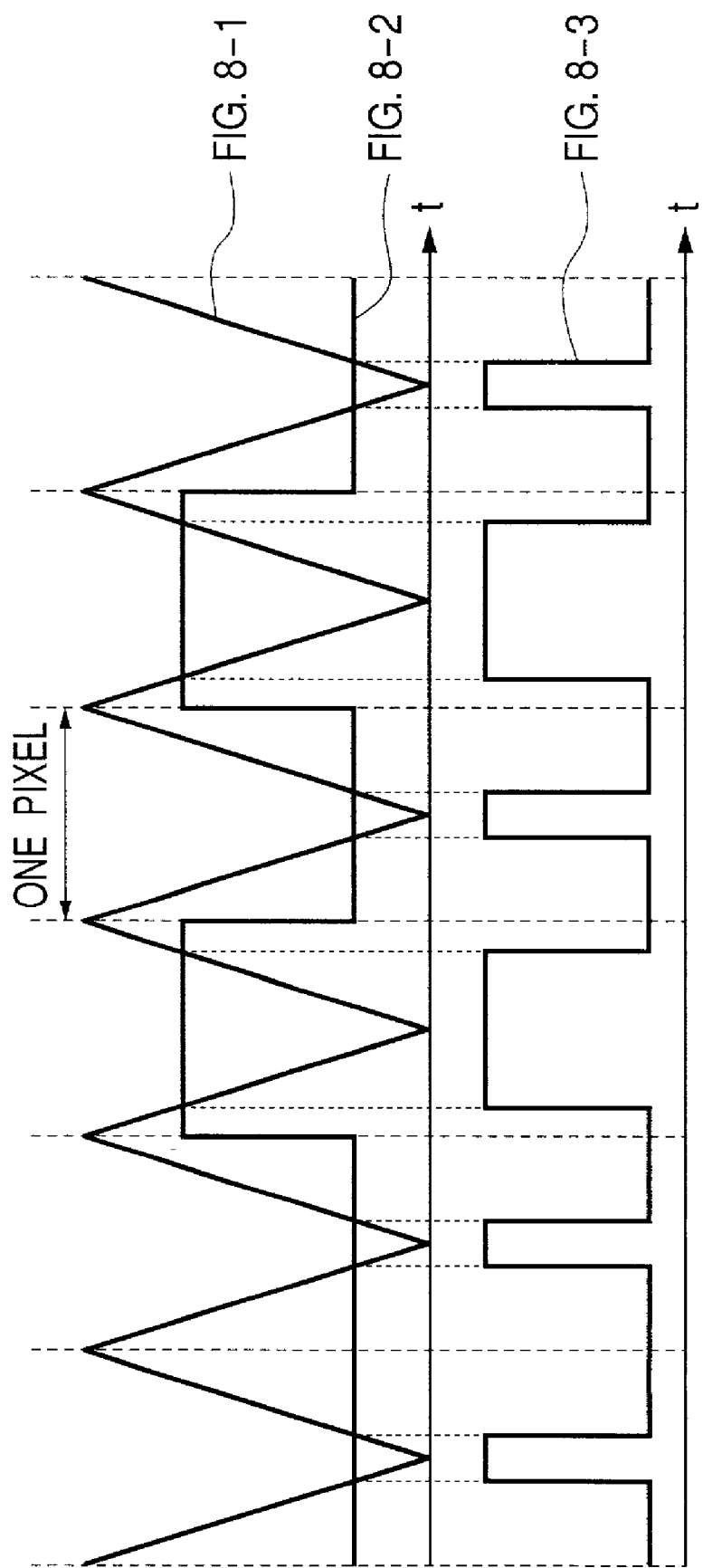
FIG. 8 is a timing chart illustrating the operation of the PWM unit of the image forming apparatus.

With reference to FIG. 7, the PWM unit 208 will be described. Image data of yellow (Y), magenta (M), cyan (C) and black (K) of four separated colors (single color for MFP 105) output from the printer IP unit 207 is used for forming images by the PWM unit 208. A signal (FIGS. 8-1) from a triangular wave generating unit 801 and a signal (FIGS. 8-2) from a D/A converter 802 for converting an input digital image signal into an analog signal are compared by a comparator 803 which outputs a signal shown in FIGS. 8-3. This signal is supplied to a laser drive unit 804, and respective laser units 805 converts CMYK signals into laser beams.

Each laser beam is scanned by a polygon mirror 913 and applied to each of photosensitive drums 917, 921, 925 and 929.

Structure of Printer Unit 209 (for Color MFP 104)

Figure 9:
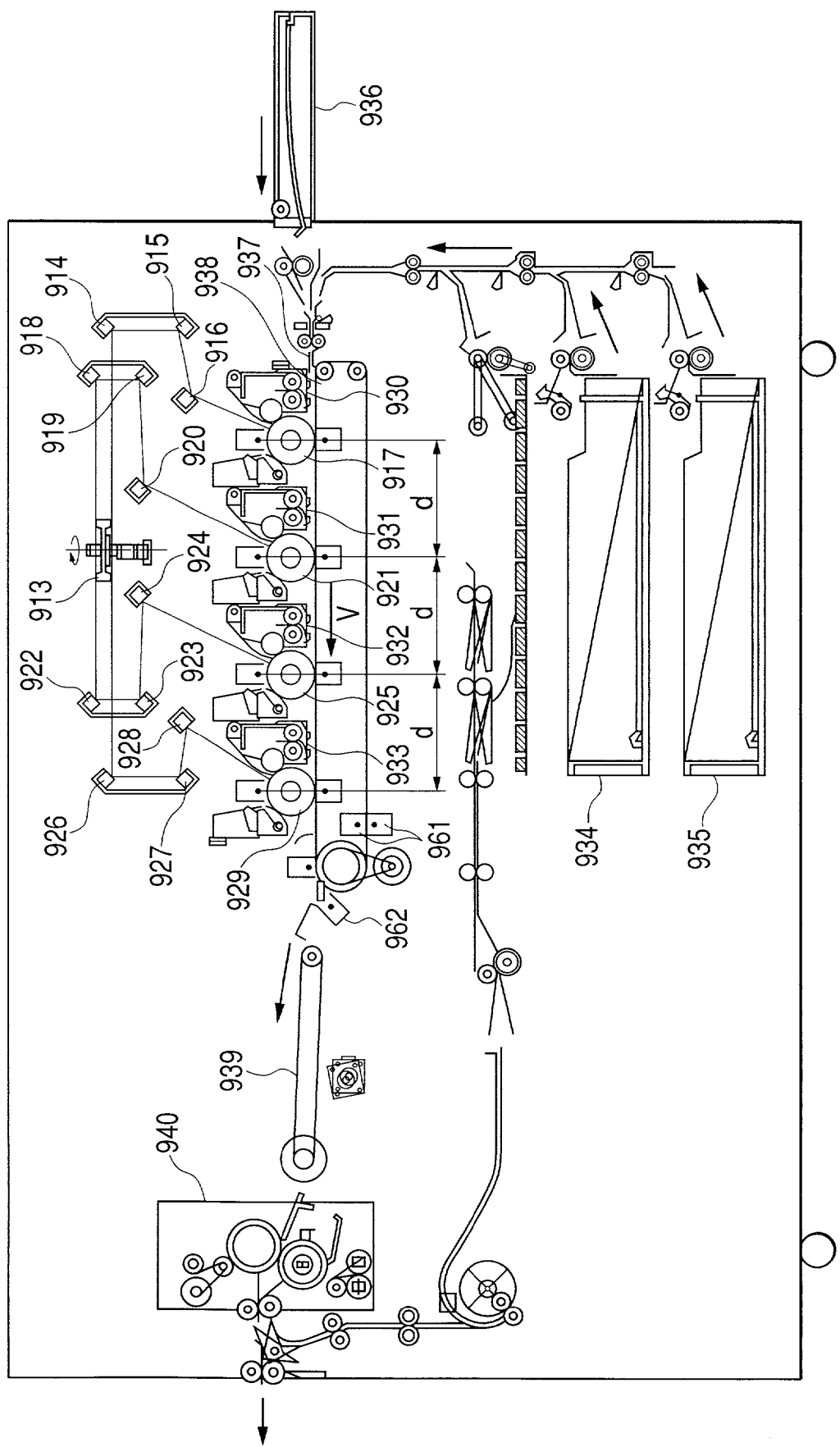
FIG. 9 is a diagram showing a printer unit of a color image forming apparatus.

FIG. 9 is a schematic diagram showing the color printer unit. Four laser beams emitted from the four semiconductor laser units 805 are applied to a polygon mirror 913. One of the four laser beams scans the photosensitive drum 917 via mirrors 914, 915 and 916. Another laser beam scans the photosensitive drum 921 via mirrors 918, 919 and 920. Another laser beam scans the photosensitive drum 925 via mirrors 922, 923 and 924. Another laser beam scans the photosensitive drum 929 via mirrors 926, 927 and 928.

A developer 930 supplies yellow (Y) toner and forms a yellow toner image on the photosensitive drum 917 in accordance with the laser beam. A developer 931 supplies magenta (M) toner and forms a magenta toner image on the photosensitive drum 921 in accordance with the laser beam. A developer 932 supplies cyan (C) toner and forms a cyan toner image on the photosensitive drum 925 in accordance with the laser beam. A developer 933 supplies black (K) toner and forms a black toner image on the photosensitive drum 929 in accordance with the laser beam. Toner images of four colors (Y, M, C, K) are transferred to a sheet so that a full color output image can be formed.

A sheet supplied from either a sheet cassette 934, 935 or a manual tray 936 is sucked to a transfer belt 938 via registration rollers 937 and transported. Synchronously with paper feed timing, respective color toners are developed beforehand on the photosensitive drums 917, 921, 925 and 929. As the sheet is transported, each toner is transferred to the sheet. The sheet transferred with respective toners is separated and transported by a transport belt 939, and toners are fixed to the sheet by a fixing unit 940. The sheet passed through the fixing unit 940 is guided once downward by a flapper 950. After the back end of the sheet passes through the flapper 950, the sheet is switched back and ejected out. Therefore, the sheet is ejected face-down so that the ejected sheets are arranged in the correct page order starting from the top page.

The four photosensitive drums 917, 921, 925 and 929 are disposed at an equal interval of a distance d. A sheet is transported at a constant speed v by the transport belt 939. Synchronously with this transport, the four semiconductor laser units 805 are driven.

Structure of Printer Unit 209 (for Monochromatic MFP 105)

Figure 10:
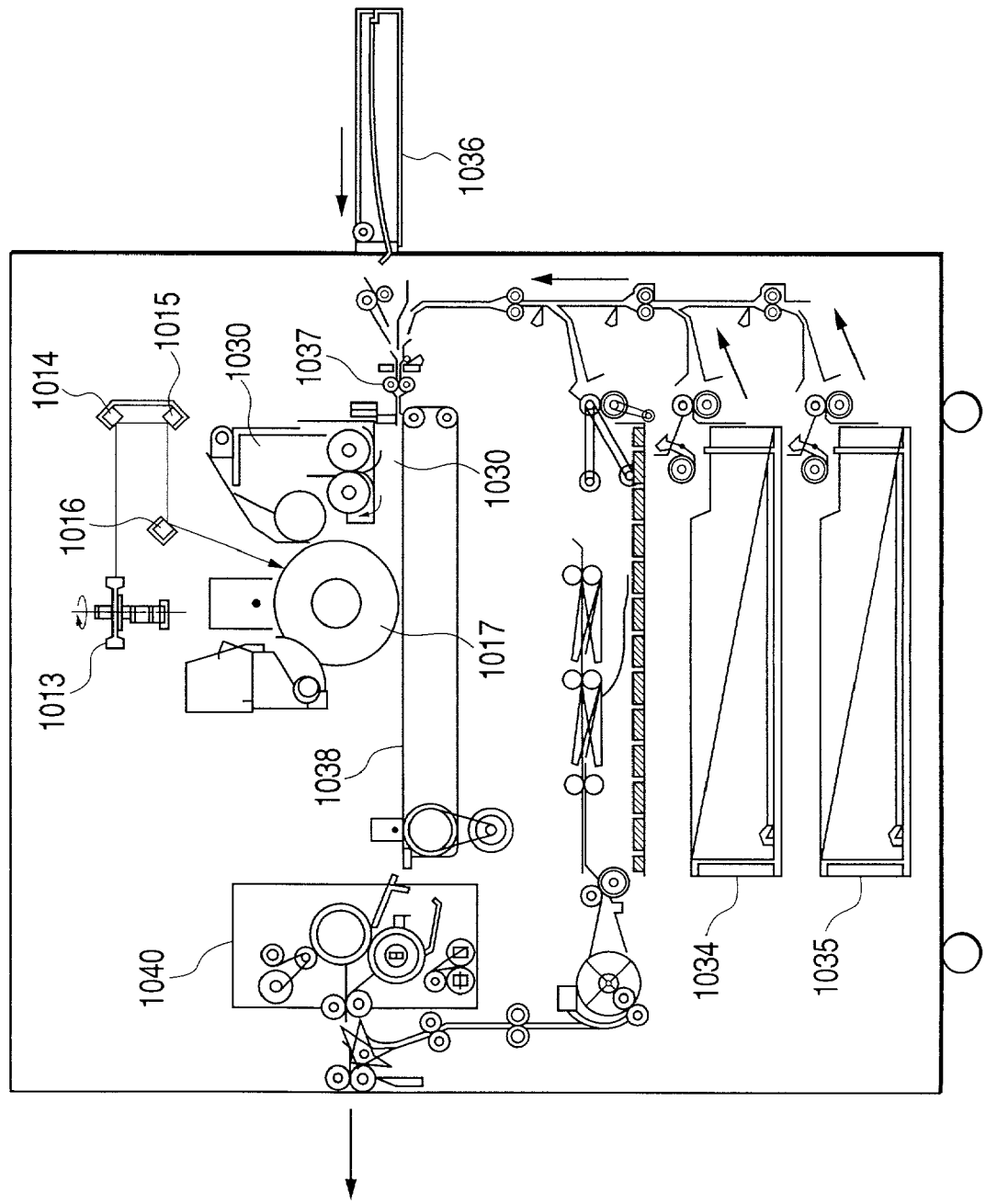
FIG. 10 is a diagram showing a printer unit of a white and black image forming apparatus.

FIG. 10 is a schematic diagram showing the monochromatic printer unit. Four laser beams emitted from the four semiconductor laser units 805 are applied to a polygon mirror 1013. Each laser beam scans a photosensitive drum 1017 via mirrors 1014, 1015 and 1016. A developer 1030 supplies black toner and forms a toner image on the photosensitive drum 1017 in accordance with the laser beam to obtain an output image.

A sheet supplied from either a sheet cassette 1034, 1035 or a manual tray 1036 is sucked to a transfer belt 1038 via registration rollers 1037 and transported. Synchronously with paper feed timing, toner is developed beforehand on the photosensitive drums 1017. As the sheet is transported, the toner is transferred to the sheet. The sheet transferred with the toner is separated and the toner is fixed to the sheet by a fixing unit 1040. The sheet passed through the fixing unit 1040 is guided once downward by a flapper 1050. After the back end of the sheet passes through the flapper 1050, the sheet is switched back and ejected out. Therefore, the sheet is ejected in a face-down state so that printed-out sheets are arranged in the correct page order starting from the top page.

Structure of Finisher Unit 210

Figure 11:
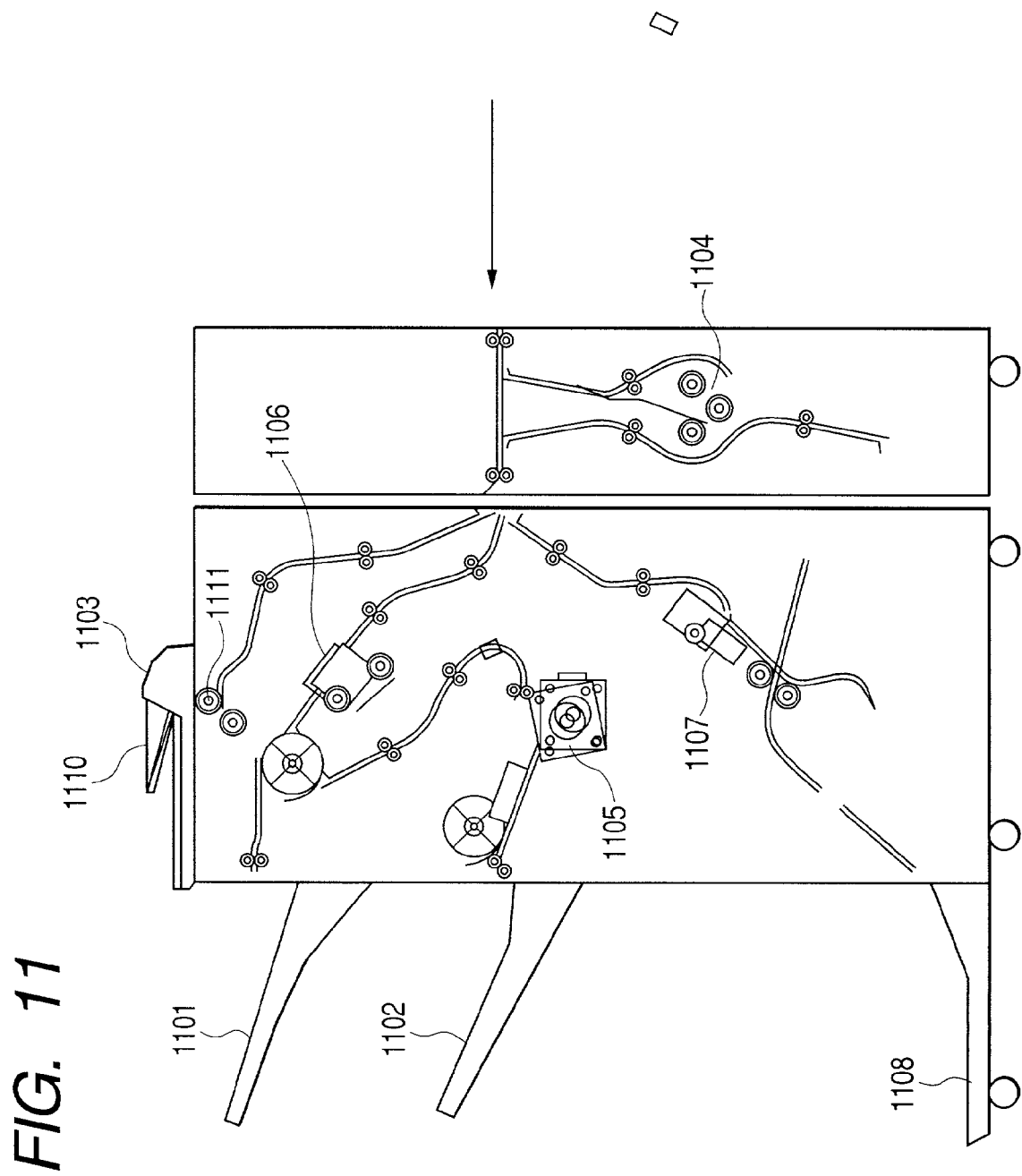
FIG. 11 is a diagram showing a finisher unit of the image forming apparatus.

FIG. 11 is a schematic diagram showing the finisher unit. A sheet output from the fixing unit 940 (or 1040) of the printer unit 209 enters the finisher unit 210. The finisher unit 210 has a sample tray 1101 and a stack tray 1102. Each sheet is ejected out in accordance with the type of a job and the number of sheets to be ejected.

There are two sorting methods. One is a bin sorting method of sorting sheets into a plurality of bins. The other is a shift sorting method using an electronic sorting function to be described later, the method sorting sheets for each job by shifting a bin (or tray) forward along the depth direction. The electronic sorting function is called a collate function. The collate function exchanges a page order buffered in the large capacity memory of the core unit with a page eject order. A grouping function sorts sheets for each page instead of for each job.

When a sheet is ejected to the stack tray 1102, sheets before ejection may be stored for each job, in order to bind the sheets with a stapler 1105 immediately before they are ejected.

On the route to the two trays, a Z folding machine 1104 for folding a sheet in a Z-shape and a puncher 1106 for forming two (or three) holes through sheets for filing are provided. The Z folding machine and puncher are used in accordance with the type of job being performed.

A saddle stitcher 1107 binds sheets at two positions in the sheet center area and then squeezes the center area by rollers to fold the sheets by halves and form a booklet such as a weekly magazine and a pamphlet. Sheets bound with the saddle stitcher 1107 is ejected from a booklet tray 1108.

Although not shown in FIG. 11, a function of binding with glue, a function of trimming side edges opposite to the bound sides and the like may also be provided.

An inserter 1103 is used for sending sheets set to a tray 1110 to one of the trays 1101, 1102 and 1108 without sending them to the printer. It is therefore possible to insert a sheet set to the inserter 1103 between sheets supplied to the finisher 209. Sheets in the face-up state are set to the tray 1110 of the inserter 1103, and the sheets are fed by pickup rollers 1111 starting from the uppermost sheet. Therefore, the sheets from the inserter 1103 are directly transported by pickup rollers 1111 to the tray 1101, 1102 to eject them in the face-down state. When sheets are sent to the saddle stitcher 1107, they are once transported to the puncher 1106 side and then switched back to obtain the same face direction.

Structure of Document Server 102

Figure 12:
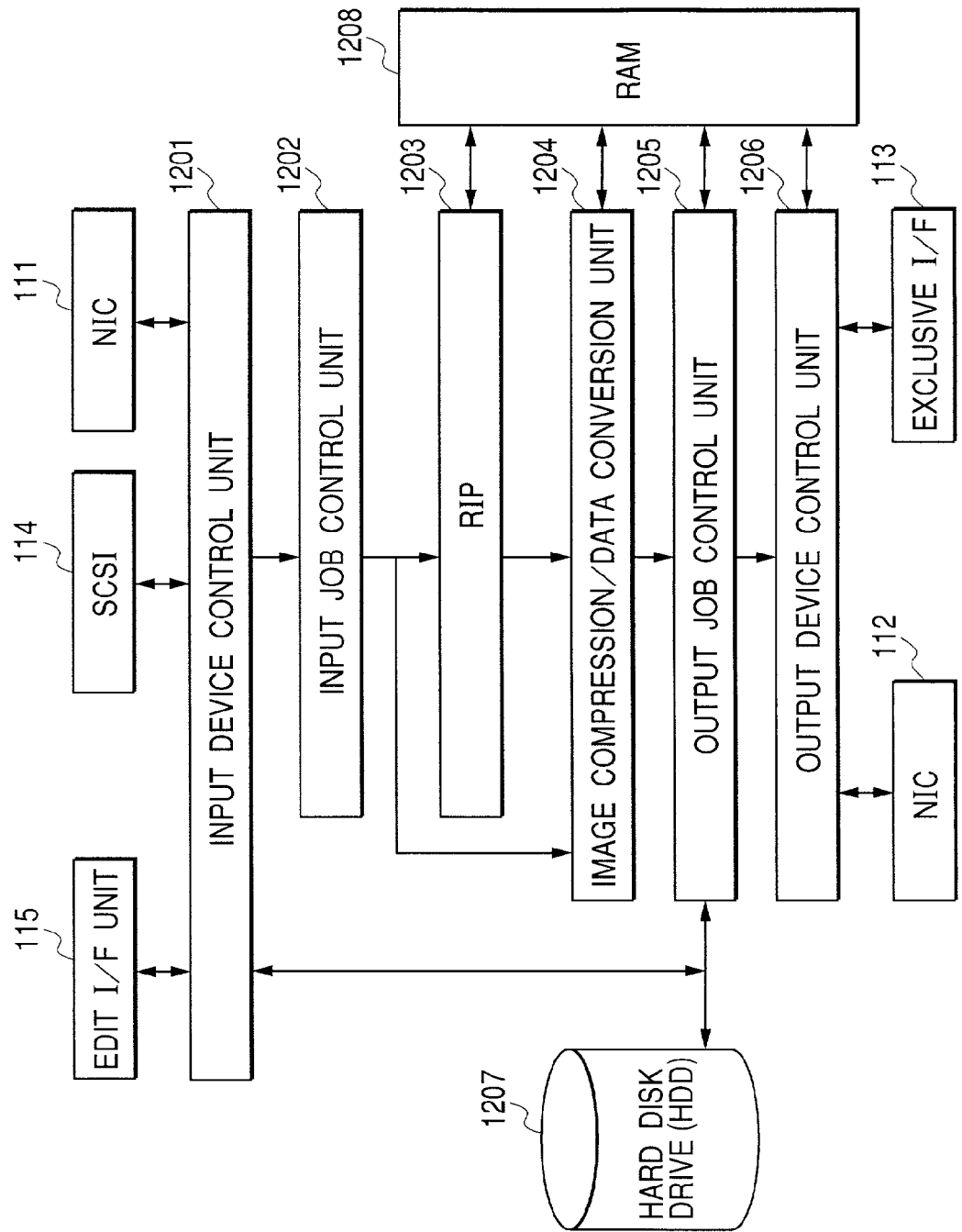
FIG. 12 is a job flow inside of a document server according to the invention.

With reference to FIG. 12, the document server 102 will be described.

A job input from NIC 111 is supplied to the server via an input device control unit 1201. The job is processed in the server by using various client applications. As input data, PDL data and JCL (job control language) data are accepted. By using status information of printers and the server, client requests are processed. This module outputs data obtained by combining proper PDL and JCL data.

An input job control unit 1202 forms a job list for managing a list of requests by jobs and accessing each job supplied to the server. This module has a job routing function of determining a job route and a job scheduling function of determining a job order.

A rasterizing (RIP) unit 1203 performs an RIP process for PDL to create a bit map having a proper size and resolution. The RIP unit 1203 can perform a rasterizing process for data having various formats such as PostScript (registered trademark of Adobe Systems Incorporated), PCL, TIFF, JPEG and PDF.

A data conversion unit 1204 performs compression and format conversion of a bit map image formed by the RIP unit, and selects the optimum image type matching each printer. For example, if a job is to be processed in the page unit, a PDF header is added to the bit map data of TIFF, JPEG or the like rasterized by the RIP unit, and the bit map image is edited as PDF data.

In accordance with command settings, an output job control unit 1205 manages how a page image of the job is processed. For example, the page image is printed by a printer or saved in a hard disk drive (HDD) 1207. It is also possible to judge whether or not the printed job is to be saved in the hard disk drive (HDD) 1207. If saved, it may be called again. The output job control unit 1205 also manages the cooperation between the hard disk drive (HDD) 1207 and a RAM 1208.

An output device control unit 1206 controls to select a device whereat a job is output and to select devices for clustering (printing by a plurality printers at the same time). The output device control unit 1206 also monitors the status of the devices 104, 105 and supplies the device status to the document server 102.

Structure of Page Description Language and RIP Unit 1203

A device for developing data described with PDL (Page Description Language), typically PostScript (registered trademark of Adobe Systems Incorporated), into bit map data capable of print and display, is generally called a RIP (Raster Image Processor). RIP may be realized by hardware or software, which is called a hardware RIP or a software RIP.

Figure 13:
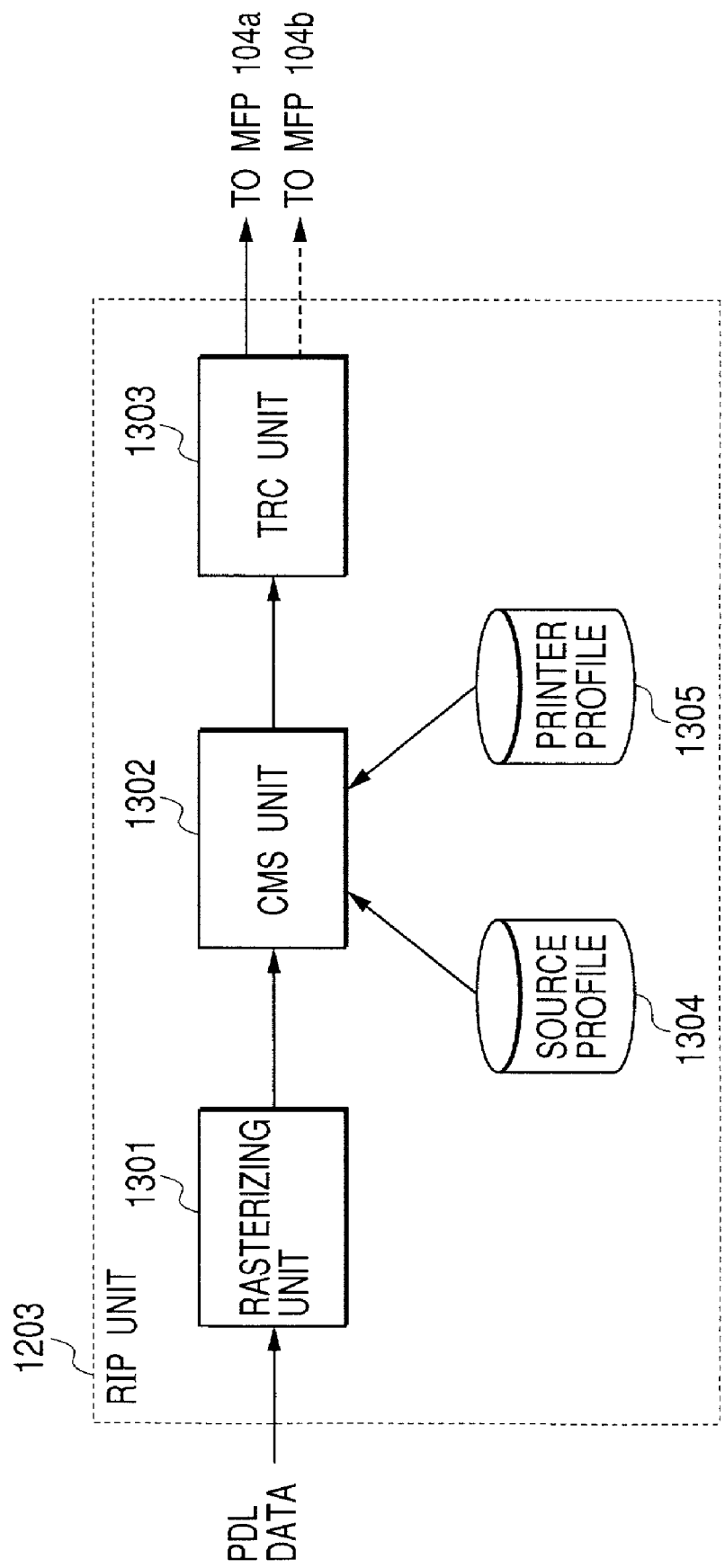
FIG. 13 is a diagram showing the structure of an RIP unit.

FIG. 13 shows the structure of the RIP unit 1203. The RIP unit 1203 is constituted of a rasterizing unit 1301, a CMS (Color Management System) unit 1302 and a TRC (Tone Reproduction Curve) unit 1303. The rasterizing unit 1301 converts PDL data into bit map data having a resolution matching print and display. The CMS unit 1302 manages colors, and the TRC unit 1303 performs a gamma correction for maintaining linearity of CMYK colors.

Rasterizing Unit 1301

PDL data is generally classified into the following factors, and an original image is constituted of a combination of these factors:

(a) Image description by character codes (b) Image description by figure codes (c) Image description by raster image data FIG. 14 shows a description example of PDL data in left side, and FIG. 14 shows the development result of the PDL data shown in right side of FIG. 14.

A description example of character information will be described by using character information R1401. L1411 is a description of designating a character color, the densities of C, M, Y and B being indicated between the parentheses. A minimum value of a color designation command is 0.0 and a maximum value is 1.0. L1411 indicates that the character is black. L1412 substitutes a character string "IC" in a variable String 1. First and second parameters in L1413 indicate the X- and Y-coordinate values of the start position of a sheet on which the character string is laid out. The third parameter indicates the size of the character, the fourth parameter indicates the space between characters, and the fifth parameter indicates the character string to be laid out. L1413 therefore instructs to lay out the character string "IC" from the coordinate (0.0, 0.0) at the size of 0.3 and a space of 0.1.

A description example of figure information will be described by using figure information R1402. Similar to L1411, L1421 designates a line color, in this example, cyan is designated. L1422 designates to draw a line. First and second parameters indicate the X- and Y-coordinate values of a start position of the line, and third and fourth parameters indicate the X- and Y-coordinate values of an end position of the line. The fifth parameter indicates a width of the line.

A description example of raster image information will be described by using raster image information R1403. L1431 substitutes a raster image into a variable image 1. The first parameter indicates the type of the raster image and the number of color compositions. The second parameter indicates the number of bits per one color composition. The third and fourth parameters indicate the size of the raster image in the X- and Y-directions. The fifth and following parameters represent raster image data. The number of raster image data pieces corresponds to a product of the number of color compositions constituting one pixel and the image size in the X- and Y-directions. In L1431, since the CMYK image is constituted of four color compositions (cyan, magenta, yellow and black), the number of raster image data pieces is (4×5× 5)=100. L1432 indicates that the image 1 is laid out from the coordinate (0.0, 0.5) at a size of 0.5×0.5.

FIG. 14 (right side) shows the development result of the raster image data obtained by analyzing the three image descriptions of one page. R1401, R1402 and R1403 are obtained by developing PDL data. This raster image data is actually developed in RAM 1208 (or image disk 1207) for each of CMYK colors. For example, the portion of R1401 is written in RAM 1208 for each of CMYK colors as C=0, M=0, Y=0, and K=255, and the portion of R1402 is written as C=255, M=0, Y=0 and K=0.

In the document server 102, PDL data sent from the client 103 (or document server itself) is directly written in RAM 1208 (or image disk 1207) or it is developed into a raster image and then written. The stored data is maintained to be stored when necessary.

CMS (Color Management System) Unit 1302

The CMS unit 1302 shown in FIG. 13 performs color matching by selecting a conversion table source profile 1304 or a conversion table printer profile 1305, which is a so-called ICC (International Color Consortium) profile. Namely, input image data is processed by using the correction conditions of the characteristics of input image data described in the source profile and the correction conditions of the characteristics of a printer described in the printer profile.

PDL data includes two kinds, RGB series and CMYK series. The latter PDL data (mainly PostScript) is generated by some applications capable of processing data in the unit of CMYK, such as Photoshop and Illustrator (registered trademarks of Adobe Systems Incorporated). The former PDL data (mainly Postscript) is generated by other applications, and includes data having the format of TIFF and JPEG.

Generally, the ICC profile stores a sequence formula train, a multi-dimension look-up table and the like. In this embodiment, in order to simplify the description, conversion by using a sequence formula is used. Similar processes may be used also for other types such as three-dimension look-up tables.

When PDL data of the RGB series is input, the RGB data is once converted into a standardized L*a*b* space by using a formula E1501 shown in FIG. 15 stored in the source profile. The source profile 1304 may be profiles of various displays typically S-RGB or profiles for various input devices such as digital cameras and scanners, and stores a sequence formula {a00, . . . , a22} for each type of devices.

Similarly, when PDL data of the CMYK series is input, the CMYK data is once converted into a standardized L*a*b* space by using a formula E1502 stored in the printer profile. When an ink color reproduction such as SWOP, Euroscale and JapanColor is to be simulated, it is necessary to store a sequence formula {b00, . . . , b23} corresponding to not only the type of a printer but also a subject to be simulated.

Next, the L*a*b* is converted into the CMYK data matching the printer. In this embodiment, data is printed by MFP 104a so that conversion is performed by using the formula E1503.

This sequence formula {c00, . . . , c32} is prepared for each type of printers. For example, if MFP 104a and MFP 104b are different types, E1503 is a profile for MFP 104a, whereas E1504 is a profile for MFP 104b. If a target device is changed, another profile is selected.

For the printer profile, a plurality of sequence formulas may be prepared to select one of them in accordance with a method of adjusting a difference of the reproduction range between displays, input devices and output devices, which method is called rendering intent such as "perceptual (hue retention)", "colormetric (minimum color difference)" and "saturation (saturation preference)".

The reason why data is once converted into the standardized space is to always ensure the equivalent hue even if colors under the various input environments such as scanners and displays are output under various output environments such as printers.

TRC (Tone Reproduction Curve) Unit 1303

Figure 3:
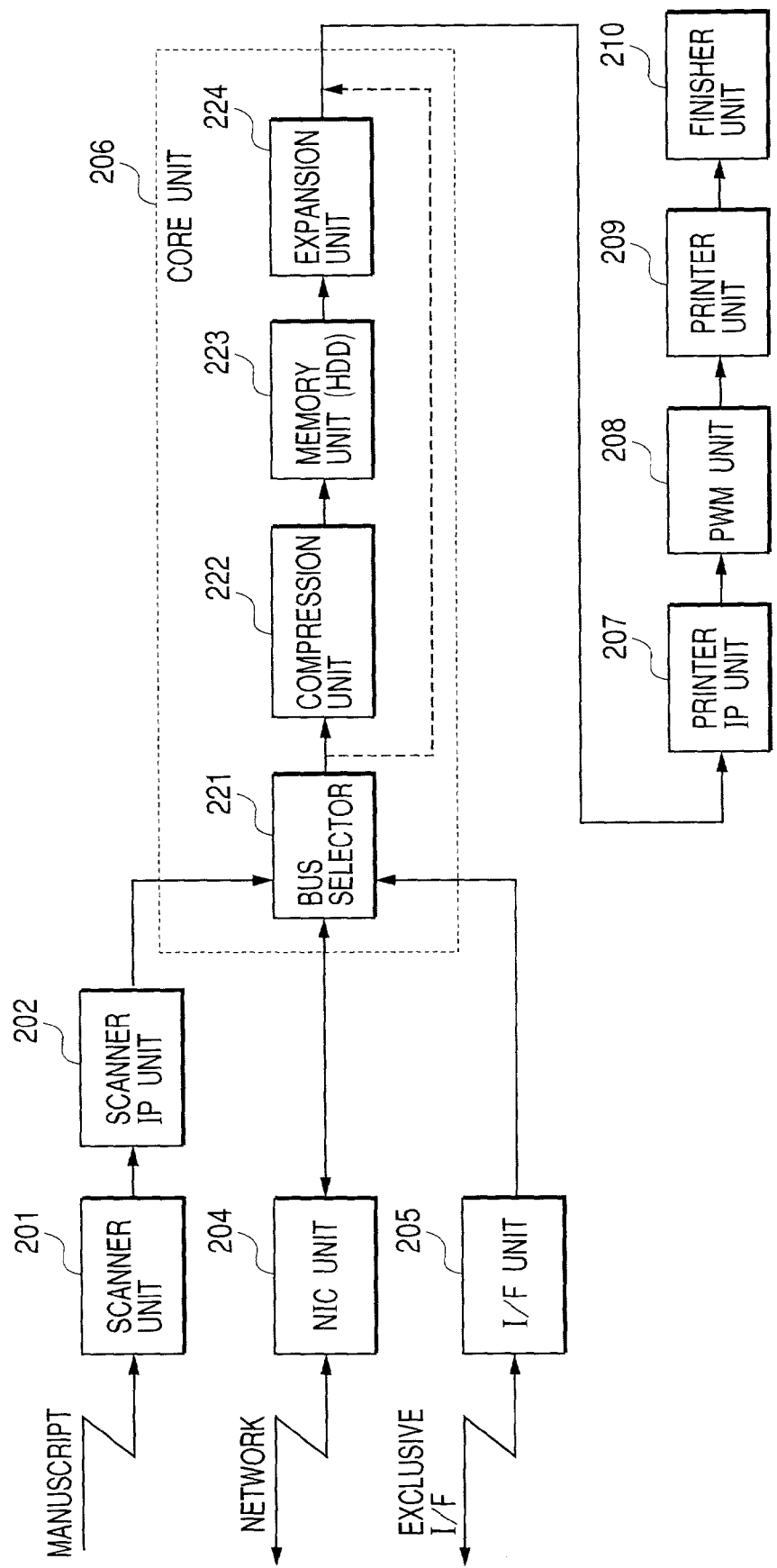
FIG. 3 is a block diagram showing the entirety of an image forming apparatus.
Figures 17, 18:
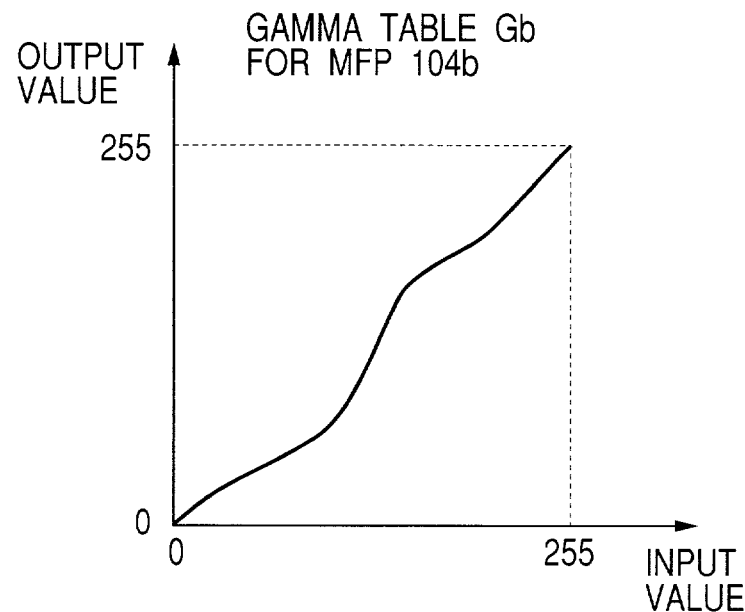
FIG. 17 is a diagram showing a gamma curve.
FIG. 18 is a test chart for calibration.

The TRC unit 1303 performs a gamma conversion of a value of each of the CMYK colors having eight bits (0 to 255) in accordance with the gradation characteristics of each printer. Generally, an input signal converted by using a linear table G0 such as shown in FIGS. 16-1 does not show linear gradation characteristics. For example, if a chart such as shown in FIG. 18 is output and the output density is measured with a density meter, then an output result Gi is such as shown in FIGS. 16-2. To solve this problem, a gamma table Ga such as shown in FIGS. 16-3, which is a reverse gamma function of Gi (FIGS. 16-2), is used for the conversion by the TRC unit to obtain a linear print output such as shown in FIG. 16-1.

Gi and Ga are reverse function gamma tables and Ga*Gi=G0 so that the linear output results G0 can be obtained.

The gradation characteristics of a printer represented by Gi changes with time because of the environment change such as a temperature and humidity, a secular change from turn-on of a printer power source and a print start, and a durability change such as the total number of printed sheets and the consumption degree of consumables. Therefore, a linear image cannot be obtained unless the gamma table is replaced routinely.

It is therefore necessary to use a tool for calibration (linearization). A calibration tool is constituted of three steps, a step of printing a chart such as shown in FIG. 18 from a printer, a step of reading a patch density of each portion of the printed-out chart sample, and a step of correcting the gamma table of the TRC unit in accordance with the read patch density. In order to read the patch density, the scanner unit 201 or a density meter may be used.

The outline of the system and each unit of each apparatus is used in common by each embodiment of the invention. In the second and following embodiments, the same structure is represented by using an identical reference numeral and the description thereof is omitted.

Connection of Two Color MFP's 104 of Same Type (High Image Quality Processing)

The gamma table of the TRC unit is specific to each device. Therefore, if the same PDL data is output from two color MFP's at the same time, it cannot ensure the linearity of each color MFP.

Figure 19:
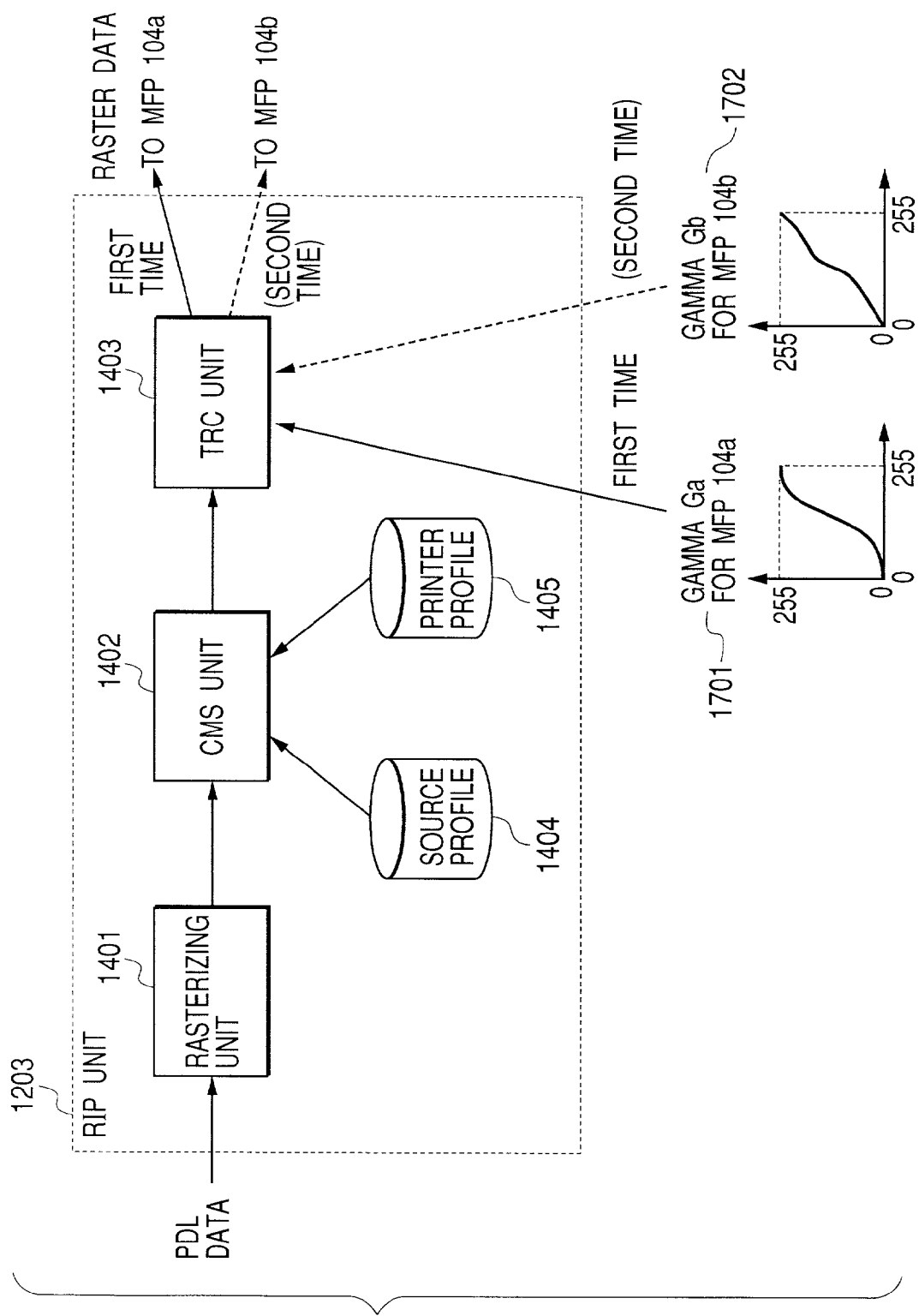
FIG. 19 is a diagram showing the structure of the RIP unit.

In order to solve this problem, it is conceivable to perform the RIP process twice as shown in FIG. 19. Input PDL data is once stored in the hard disk drive (HDD) 1207 and subjected to the RIP process twice. In the first RIP process, correction is performed by using the gamma table 1701 of MFP 104a to generate CMYK data specific to MFP 104a and output the data to MFP 104a. In the second RIP process, correction is performed by using the gamma table 1702 of MFP 104b to generate CMYK data specific to MFP 104b and output the data to MFP 104b. In this case where only one RIP unit 1203 is used, the RIP process is performed twice.

In the case that there are two RIP units 1203a and 1203b, parallel processing using the two RIP units is performed at a high speed. The RIP modules 1203a and 1203b use respective gamma tables 1701 and 1702.

Connection of Two Color MFP's 104 of Same Type (High Speed Processing)

With the above-described method of performing the RIP process twice, an image having a high quality and a hue suitable for each device can be printed. However, the RIP time is doubled because of the two RIP processes so that the print performance is sacrificed.

Figure 20:
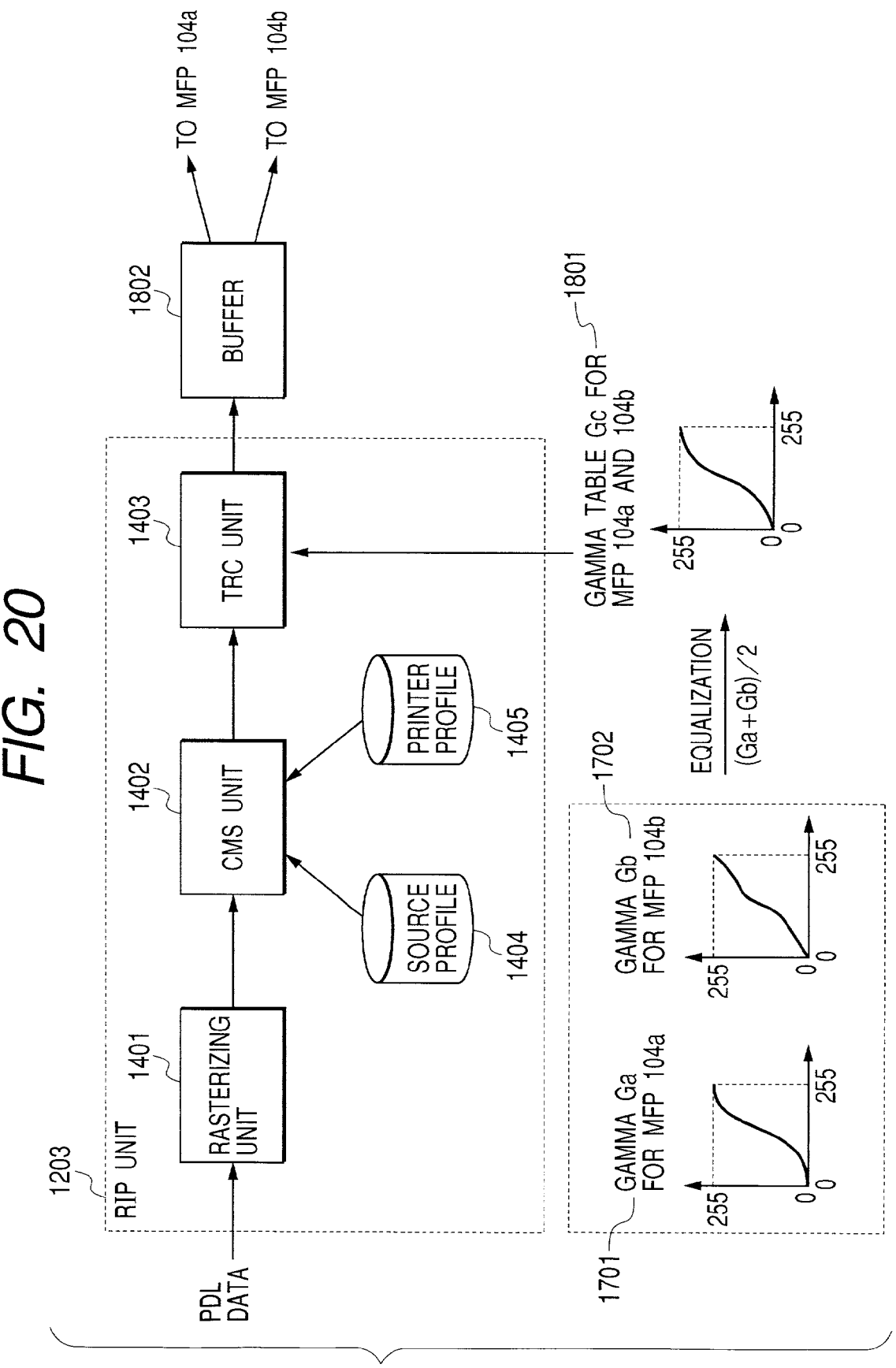
FIG. 20 is a diagram showing the structure of the RIP unit.

Consider therefore printing an image with one RIP process. In order to print an image with one RIP process, one gamma table is used. For example, as shown in FIG. 20, a new gamma table Gc 1801 is used which is obtained by averaging two gamma tables Ga 1701 and Gb 1702, so that the RIP process for both MFP 104a and MFP 104b can be performed at the same time.

The gamma table Gc is not necessarily required to use average values, but one of the gamma tables Ga and Gb may be used as a representative one. In forming an averaged gamma table, it is necessary to obtain an average value of each of the CMYK colors.

In order to operate MFP 104a and MFP 104b independently, a buffer memory 1802 is provided with synchronization between the server computer 102 and respective MFP's. By taking into consideration an operation stop of one of MFP's 104 because of jam or error, raster data of each of the CMYK colors stored in the buffer memory may be stored also in the hard disk drive (HDD) 1207.

Switching Between High Image Quality Mode and High Speed Mode

A high image quality mode and a high speed mode may be provided to allow a user to select one of them. When the high image quality mode is selected, the RIP process is performed twice by sequentially using the gamma tables for MFP 104a and MFP 104b. When the high speed mode is selected, the RIP process is performed once by using an average gamma table or a predetermined one of the gamma tables for MFP 104a and MFP 104b, and the data is supplied to MFP 104a and MFP 104b at the same time.

Information of the selection of the high image quality mode or high speed mode is added to the header information of a job, to allow the mode to be automatically selected during the job processing.

Modification of 1st Embodiment

In the first embodiment, during the high image quality mode, the RIP process is executed a plurality of times by using the gamma table corresponding to each color MFP; In contrast, in this modification, a process using the gamma table corresponding to each color MFP is executed by using the gamma conversion unit 502 (FIG. 6) of each MFP.

Therefore, in the modification, in the RIP unit 1203, a rasterizing process is executed by using the rasterizing unit 1401 and a color matching process is executed by using the CMS unit 1402, without executing the gamma conversion process using TRC 1403.

If the gamma conversion unit 502 of each color MFP can be controlled externally (e.g., from the document server), the gamma conversion unit 502 of each color MFP is used as the TRC unit 1403 so that a cluster print using a plurality of color MFP's of the same type can be performed with a high image quality and by a single RIP process.

If the gamma table is calibrated by using a calibration tool, the calibrated gamma table is downloaded in the gamma conversion unit 502.

Second Embodiment

In the first embodiment, color MFP's of the same type are connected. In the second embodiment, a modification of the first embodiment will be described in which two color MFP's of different types are connected.

Since the printer profile 1405 is different for each type, coincidence of hues cannot be obtained even if the gamma tables of the TRC units 1403 of MFP's of different types are changed.

Figure 21:
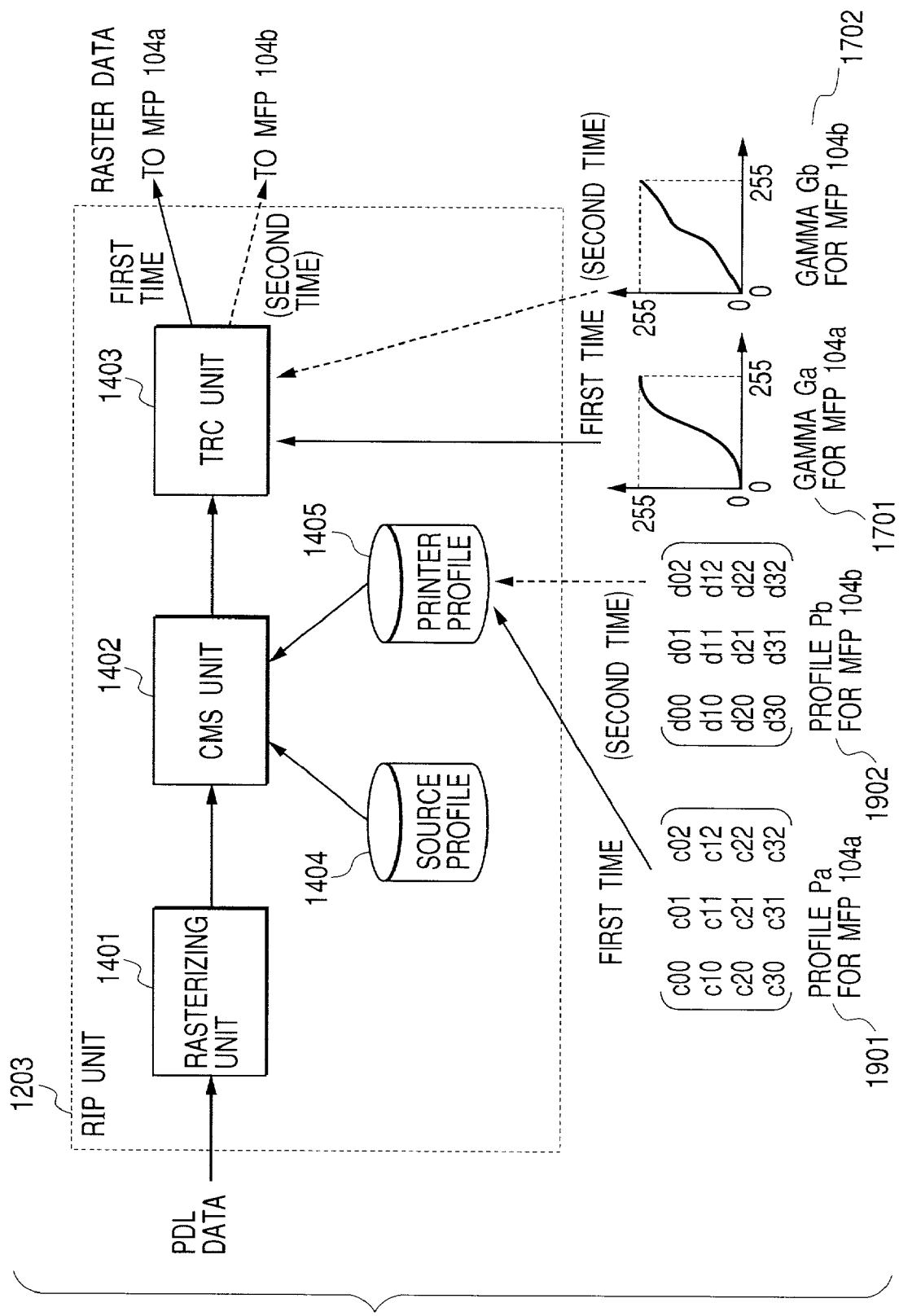
FIG. 21 is a diagram showing the structure of the RIP unit.

To solve this problem, as shown in FIG. 21, the high image quality mode is used in which the printer profile 1405 is changed for the first and second RIP processes and the REP process is executed twice. A profile Pa 1901 is a profile for MFP 104a and corresponds to the sequence formula E1503 shown in FIG. 15. If the type of MFP 104b is different, the values specific to this device also become different and a profile Pb 1902 is used. The gamma tables Ga and Gb also become different for the first and second RIP processes and are sent to the devices MFP 104a and MFP 104b.

In the high speed mode, it is necessary to use only one printer profile 1405. Therefore, as shown in FIG. 22, a sequence formula E2002 is used which is an average of a profile Pa for MFP 104a using a sequence formula E 1503 and a profile Pb for MFP 104b using a sequence formula E2001. Namely, by using a profile Pc=(Pa+Pb)/2, only one RIP process is executed. In this case, the averaged gamma table Gc is used. Although there is a small hue shift, each of the printers MFP 104a and MFP 104b can reproduce relatively neutralized hue.

Figure 23:
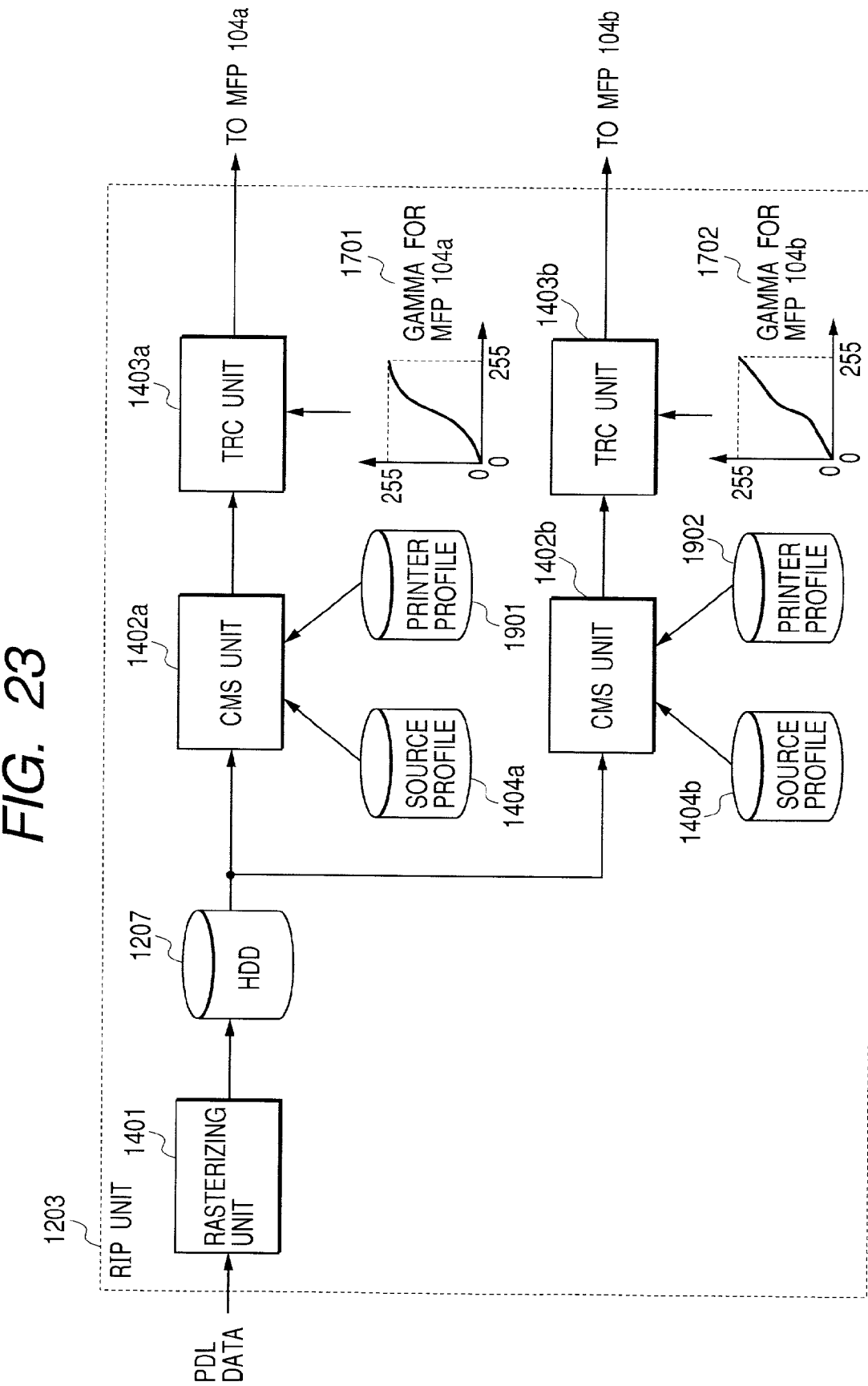
FIG. 23 is a diagram showing the structure of the RIP unit.
Figure 25:
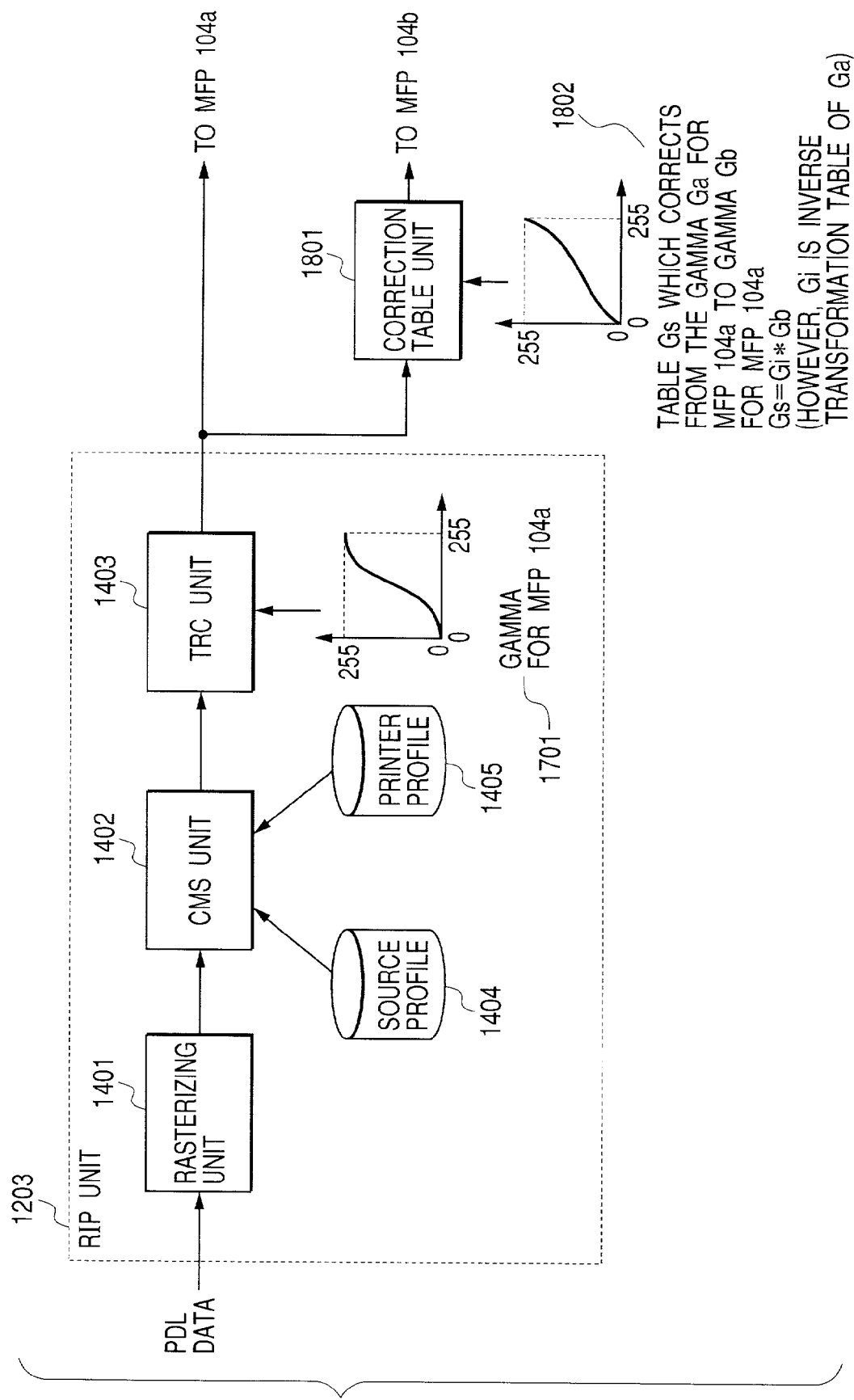
FIG. 25 is a diagram showing the structure of an RIP unit.
Figure 26:
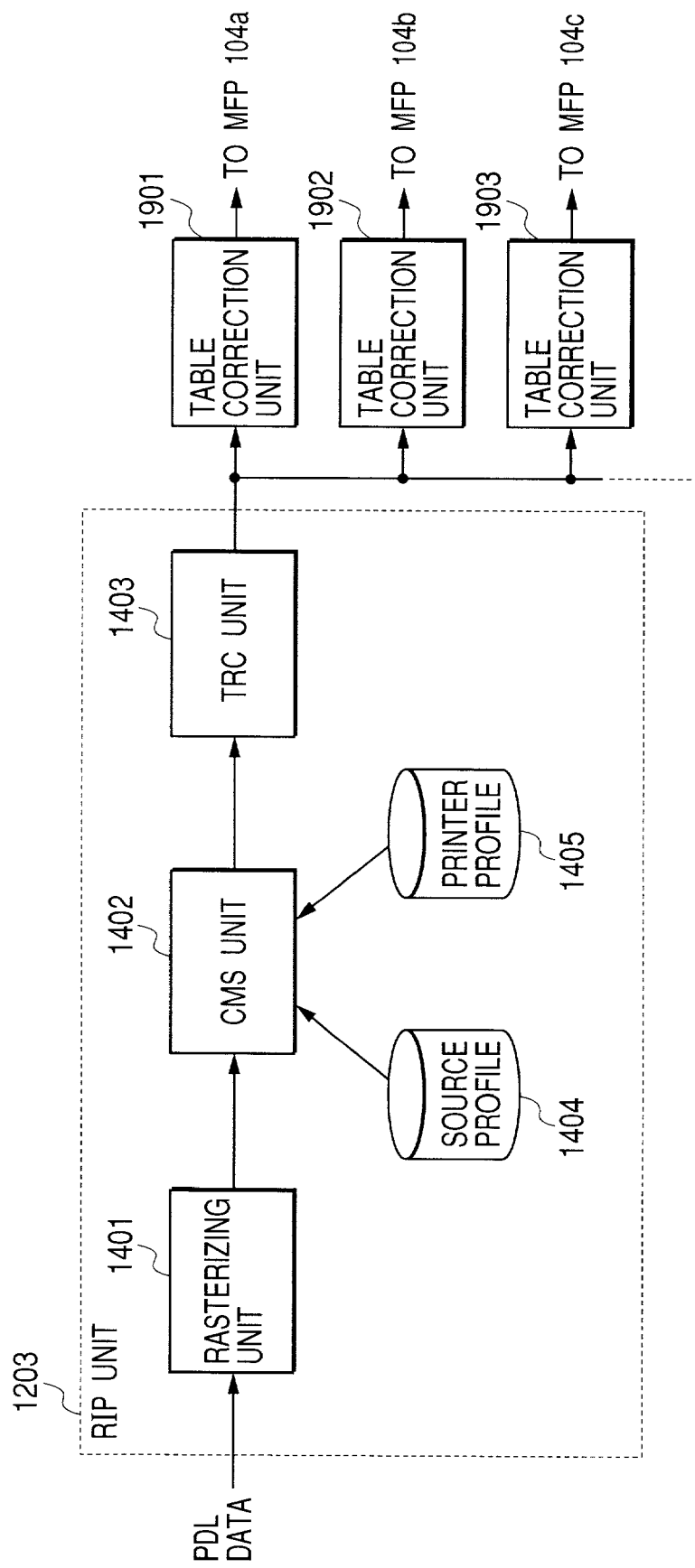
FIG. 26 is a diagram showing the structure of an RIP unit.
Figure 27:
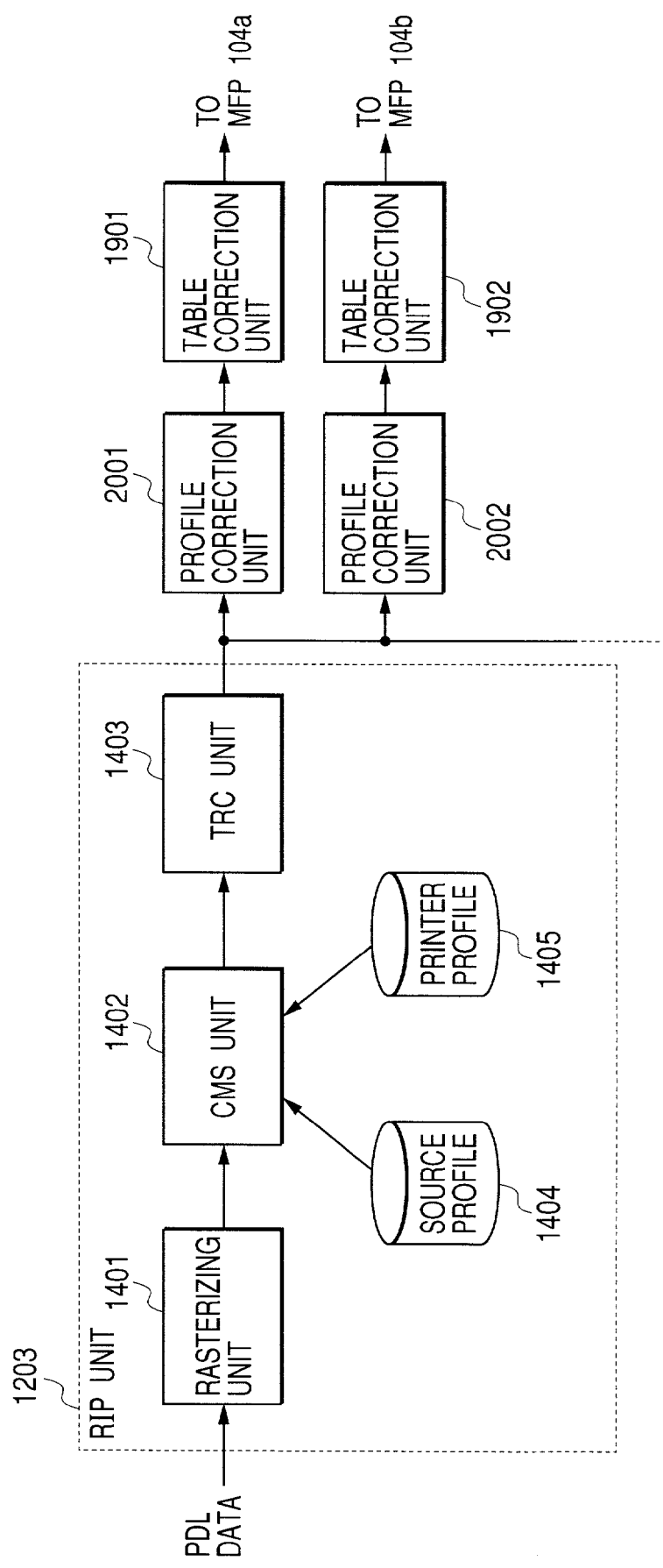
FIG. 27 is a diagram showing the structure of an RIP unit.

Alternatively, as shown in FIG. 23, PDL data output from the rasterized unit 1401 is once stored in a hard disk drive (HDD) 1207 and by using printer profiles 1901 and 1902 and gamma tables 1701 and 1702, the data is output to MFP's 104a and 104b.

Third Embodiment

In this embodiment, a modification of the first embodiment will be described in which three or more color MFP's 104 are connected. Even in this embodiment, the high image quality mode can be realized by using printer profiles and gamma tables for the first, second, third, . . . , RIP processes, and the high speed mode can be realized by using an averaged printer profile and an averaged gamma table.

For clustering using three or more color MFP's, the average values are not necessarily required to be used, but mode values or median values may also be used.

Weighting Coefficients for Profile and Gamma Table

The number of distributions of clustering is weighted in accordance with the print speed of each printer. As shown in FIG. 24, if MFP 104a is 30 ppm and MFP 104b is 20 ppm, a weighted profile represented by a sequence formula E2201 is used. In this case, a cluster is made of two printers to complete printing at the same time. MFP 104a prints 30 sheets which are 3/5 of all sheets, and is given a weighing coefficient of 3/5, whereas MFP 104b prints 20 sheets which are 2/5 of all sheets, and is given a weighing coefficient of 2/5.

Similarly, if the gamma tables for devices of the same type are to be weighted for printing, each gamma table is multiplied by a corresponding weighting coefficient to form a new gamma table, e.g., Gc=3/5*Ga+2/5*Gb.

Fourth Embodiment

One of the first to third embodiments may be selectively used for the cluster process in accordance with the type of a printer.

In this embodiment, a high image quality mode and a high speed mode are prepared for cluster print by at least two color MFP's 104 under the control of one server 102. As a user selects the high image quality mode, by changing the profiles and gamma tables matching the characteristics of color MFP's, the RIP process is executed twice for the cluster printing with hue matching each color MFP, whereas as a user selects the high speed mode, a plurality of MFP's perform the cluster printing at the same time by one RIP process to provide hue minimizing a difference between color MFP characteristics. In this manner, a color clustering system can be provided which satisfies both the needs of high image quality and high speed.

Fifth Embodiment

This embodiment provides a method of generating data for each device by one RIP process by connecting a plurality of color MFP's 104 of the same type. As shown in FIG. 20, one device (e.g., MFP 104a) prints in an ordinary state, and another (e.g., MFP 104b) prints after correcting the result of the RIP process. Namely, the former (MFP 104a) is a master and the latter (MFP 104b) is a slave.

Data for the slave is obtained by correcting CMYK data for MFP 104a processed by using the gamma table for the master (MFP 104a) by using a correction gamma table unit 1801 for correcting data for MFP 104b.

The CMYK data for MFP 104a is multiplied by the reverse function table Gi (FIGS. 16-2) of the gamma table Ga (FIGS. 16-3) for MFP 104a to obtain CMYK data before the TRC unit 1403. Then, the obtained CMYK data is multiplied by the gamma table Gb (FIG. 17) for MFP 104b to obtain CMYK data matching MFP 104b.

Namely, a correction table unit 1801 is provided with a gamma table Gs=Gi*Gb.

Connection of Three or More Color MFP's 104

The number of combinations of cluster printing increases if three or more MFP's are connected. For example, as shown in FIG. 21, if three color MFP's 104a, 104b and 104c are connected, the relation of master and slave such as the first embodiment is not always realized. Namely, the combinations of cluster are (104a and 104b), (104b and 104c), (104c and 104b) and (104a and 104b and 104c). Therefore, even if MFP 104a is used as the master, there is a combination without the master. It is therefore necessary to prepare the correction table units for all MFP's 104a, 104b and 104c.

If MFP 104a is used as the maser like the first embodiment, a gamma table Ga for MFP 104a is set to the TRC unit 1403, a linear gamma table G0 is set to a table correction unit 1901 for MFP 104a, a gamma table (Gi*Gb) is set to a table correction unit 1902 for MFP 104b, and a gamma table (Gi*Gc where Gc is a gamma table for MFP 104c) is set to a table correction unit 1903 for MFP 104c.

With this arrangement, any combination can output always the corrected CMYK data by one RIP process to each color MFP.

If calibration is newly performed, the gamma table Ga in the TRC unit 1403 is changed. Therefore, Gi is calculated again to prepare a new table at each table correction unit.

According to this embodiment, the cluster process using printers larger in number than the number of RIP units can be performed at high speed without degrading the quality of an output image.

Similar to the modification of the first embodiment, the gamma conversion unit 502 (FIG. 6) of the MFP color printer may be used. Namely, the gamma conversion unit 502 of the slave color MFP may be used as the correction table unit. In this case, the gamma table is downloaded to the slave color MFP.

Cluster Printing at MFP's of Different Types

A combination of color MFP's 104 for cluster printing of different types will be described. Since the printer profile 1405 is different for each type, coincidence of hues is not possible even if the gamma tables of TRC units 1403 of different type of devices are changed.

Similar to the gamma tables, profile correction units 2001 and 2002 for correcting the printer profile 1405 are added as shown in FIG. 22 to correct a difference between colors of devices.

A first method for this correction is to calculate approximate values of CMYK colors by using a look-up table (gamma table). This method is the same as that to be performed by the table correction unit. However, the look-up table can be integrated with the multiplied gamma table of the table correction unit.

A second method is to use a function calculation of calculating CMYK values dependent upon the device by multiplying CMYK data by a sequence formula. For example, as shown in FIG. 23, new CMYK data can be calculated by a matrix calculation such as E2003, or by using both the look-up table and matrix calculation.

CMYK image data output from the RIP unit 1203 may be stored once in the hard disk drive (HDD) 1207, to output data corrected by respective correction tables to MFP 104a, MFP 104b, and other devices.

Each of the cluster print using a plurality of MFP's of the same type and the cluster print using a plurality of MFP's of different types can be automatically selected by making the document server 102 judge the type of an output printer. A master printer is set in accordance with a predetermined priority order or information designated by a user designated a job.

In this embodiment, under the control of one server 102, the cluster print is performed by at least two color MFP's. Output data for the master is generated by performing a color correction matching the characteristics of the master color MFP, and output data for a slave color MFP is generated by preparing a correction table for correcting the master output data to the slave output data. A color clustering system can be provided which can perform the cluster print of image data matching the hue by a plurality of color MFP's at the same time and with a single RIP process.

Other Embodiments

The scope of the invention contains also the case wherein software program codes realizing the function (e.g., function illustrated in FIGS. 20 to 22) of each embodiment described above are supplied to a computer (CPU or MPU) of an apparatus or system connected to various devices realizing the embodiment function, and the computer operates the devices in accordance with the stored programs.

In this case, the software program codes themselves realize the embodiment function. Therefore, the program codes themselves and means for supplying the program codes, e.g., a storage medium storing the program codes, constitute the present invention.

The storage medium for storing such program codes may be a floppy disk, a hard disk, an optical disk, a magneto optical disk, a CD-ROM, a magnetic tape, a nonvolatile memory card, a ROM or the like.

It is understood that the program codes are included in the embodiment of the invention, wherein not only the computer executes the supplied program codes to realize the embodiment function but also the program codes in cooperation with an OS (operating system) running on the computer or with another application or the like realize the embodiment function.

It is understood that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The present invention has been described in connection with the preferred embodiments. The invention is not limited only to the above embodiments. It is that various modifications, improvements, combinations, and the like can apparent made by those skilled in the art.

What is claimed is:

1. An image processing method for processing an input job in parallel by a plurality of color image output apparatus, each having a device profile that includes multiple types of color processing conditions, said method comprising:
   a developing step of developing input image data into bit map image data,
   wherein said developing step includes first and second modes,
      wherein, in the first mode, the input image data is developed a number of times equal to the number of color image output apparatus, using a set of type(s) of color processing condition(s) from a device profile, including one or more type(s) as to which the color image output apparatus differ from each other, wherein each time the set of color processing condition(s) used corresponds to a respective color image output apparatus and the result obtained is output to that color image output apparatus, and
      wherein, in the second mode, the input image data is developed once, using an optional set of type(s) of color processing condition(s) from a device profile, including one or more type(s) as to which the color image output apparatus differ from each other, wherein the set of color processing condition(s) used corresponds to a combination of the plurality of color image output apparatus and the result obtained is output to the plurality of color image output apparatus.

2. An image processing method according to claim 1, wherein the optional set of color processing condition(s) is the average of the sets of color processing conditions corresponding to the plurality of color image output apparatus, respectively.

3. An image processing apparatus for processing an input job in parallel by a plurality of color image output apparatus, each having a device profile that includes multiple types of color processing conditions, said method comprising:
   means for developing input image data into bit map image data; and
   selecting means for selecting either a first mode or a second mode in said means for developing,
      wherein, in the first mode, the input image data is developed a number of times equal to the number of color image output apparatus, using a set of type(s) of color processing condition(s) from a device profile, including one or more type(s) as to which the color image output apparatus differ from each other, wherein each time the set of color processing condition(s) used corresponds to a respective color image output apparatus and the result obtained is output to that color image output apparatus, and
      wherein, in the second mode, the input image data is developed by once, using an optional set of type(s) of color processing condition(s) from a device profile, including one or more type(s) as to which the color image output apparatus differ from each other, wherein the set of color processing condition(s) used corresponds to a combination of the plurality of color image output apparatus and the result obtained is output to the plurality of color image output apparatus.

4. A computer-readable storage medium storing a program for realizing an image processing method for processing an input job in parallel by a plurality of color image output apparatus, each having a device profile that includes multiple types of color processing conditions, the program comprising:
   a developing step of developing input image data into bit map image data, said developing step including selectively developing in either a first mode or a second mode,
      wherein, in the first mode, the input image data is developed a plurality of times equal to the number of color image output apparatus, using a set of type(s) of color processing condition(s) from a device profile, including one or more type(s) as to which the color image output apparatus differ from each other, wherein each time the set of color processing condition(s) used corresponds to a respective color image output apparatus and the result obtained is output to that color image output apparatus, and
      wherein, in the second mode, the input image data is developed by once, using an optional set of type(s) of color processing condition(s) from a device profile, including one or more type(s) as to which the color image output apparatus differ from each other, wherein the set of color processing condition(s) used corresponds to a combination of the plurality of color image output apparatus and the result obtained is output to the plurality of color image output apparatus.

* * * * *